United States Patent
Symes et al.

(10) Patent No.: US 11,620,503 B2
(45) Date of Patent: Apr. 4, 2023

(54) NEURAL NETWORK PROCESSING

(71) Applicant: Arm Limited, Cambridge (GB)

(72) Inventors: Dominic Hugo Symes, Cambridge (GB); Rune Holm, Cambridge (GB)

(73) Assignee: Arm Limited, Cambridge (GB)

( * ) Notice: Subject to any disclaimer, the term of this patent is extended or adjusted under 35 U.S.C. 154(b) by 365 days.

(21) Appl. No.: 16/823,063

(22) Filed: Mar. 18, 2020

(65) Prior Publication Data

US 2021/0295138 A1 Sep. 23, 2021

(51) Int. Cl.
  *G06N 3/063* (2006.01)
  *G06N 3/04* (2006.01)
(52) U.S. Cl.
  CPC .............. *G06N 3/063* (2013.01); *G06N 3/04* (2013.01)
(58) Field of Classification Search
  None
  See application file for complete search history.

(56) References Cited

U.S. PATENT DOCUMENTS

| | | | | |
|---|---|---|---|---|
| 10,990,650 | B1* | 4/2021 | Vantrease | G06N 3/08 |
| 2016/0358069 | A1* | 12/2016 | Brothers | G06F 7/764 |
| 2018/0096226 | A1* | 4/2018 | Aliabadi | G06N 3/084 |
| 2019/0220742 | A1* | 7/2019 | Kuo | G06F 12/084 |
| 2021/0174180 | A1* | 6/2021 | Huang | G11C 11/54 |
| 2021/0182186 | A1* | 6/2021 | Lew | G06F 7/523 |
| 2021/0264632 | A1* | 8/2021 | Tankovich | G06T 3/0093 |

OTHER PUBLICATIONS

W. Ding, Y. Zhang, J. Liu and M. Kandemir, "Optimizing data locality using array tiling," 2011 IEEE/ACM International Conference on Computer-Aided Design (ICCAD), 2011, pp. 142-149, doi: 10.1109/ICCAD.2011.6105318. (Year: 2011).*

\* cited by examiner

*Primary Examiner* — James A Thompson
(74) *Attorney, Agent, or Firm* — Vierra Magen Marcus LLP

(57) ABSTRACT

A method for performing neural network processing, and a corresponding data processing system. The data processing system is configured to define one or more tiles for use when reading a portion of an input feature map from memory or writing a portion of an output feature map to memory. The data processing system is also configured to provide information which allows positions falling within the defined one or more tiles to be mapped to memory locations to allow a processor to read data for an input feature map from memory or to write data for a portion of an output feature map to memory.

17 Claims, 16 Drawing Sheets

Dataflow for Cascaded Operations A, B

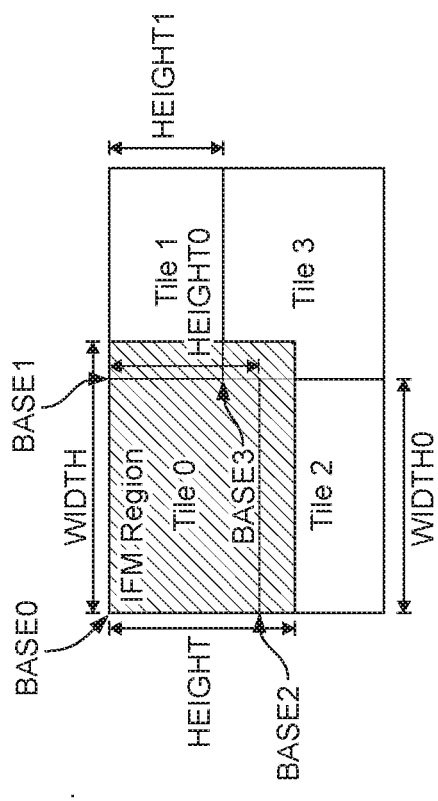

Input Feature Map

The input feature map is defined in memory by the following variables.

| Name | Function |
|---|---|
| IFM_BASE0 | Base address for IFM (top left tile) |
| IFM_BASE1 | Address for IFM top right tile |
| IFM_BASE2 | Address for IFM bottom left tile |
| IFM_BASE3 | Address for IFM bottom right tile |
| IFM_STRIDE_X | Stride between X elements in bytes |
| IFM_STRIDE_Y | Stride between Y elements in bytes |
| IFM_WIDTH | Stride between channel blocks in bytes |
| IFM_HEIGHT | Stride between batches in bytes |
| IFM_DEPTH | Depth of IFM |
| IFM_WIDTH0 | Tile 0 width (=Tile 2 width) |
| IFM_HEIGHT0 | Tile 0 height |
| IFM_HEIGHT1 | Tile 1 height |

Note: Tiles 0 to 3 much be sufficiently large to cover the used for operation calculation (WIDTH x HEIGHT).

FIG. 8

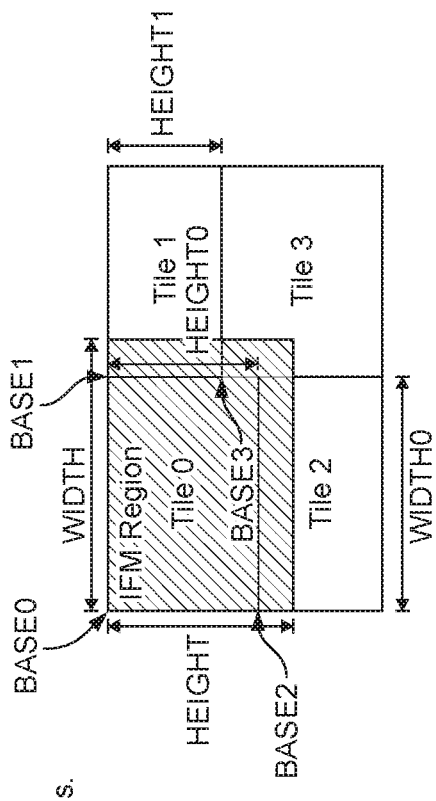

Output Feature Map

The output feature map is defined in memory by the following variables.

| Name | Function |
|---|---|
| OFM_BASE0 | Base address for OFM (top left tile) |
| OFM_BASE1 | Address for OFM top right tile |
| OFM_BASE2 | Address for OFM bottom left tile |
| OFM_BASE3 | Address for OFM bottom right tile |
| OFM_STRIDE_X | Stride between X elements in bytes |
| OFM_STRIDE_Y | Stride between Y elements in bytes |
| OFM_STRIDE_C | Stride between channel blocks in bytes |
| OFM_STRIDE_N | Stride between batches in bytes |
| OFM_WIDTH | Width of OFM |
| OFM_HEIGHT | Height of OFM |
| OFM_DEPTH | Depth of OFM |
| OFM_WIDTH0 | Tile 0 width (=Tile 2 width) |
| OFM_HEIGHT0 | Tile 0 height |
| OFM_HEIGHT1 | Tile 1 height |

Note: Tiles 0 to 3 much be sufficiently large to cover the area written by the operation calculation (WIDTH x HEIGHT).

FIG. 9

NEURAL NETWORK PROCESSING

BACKGROUND

The technology described herein relates to the processing of feature maps in neural networks.

Neural networks can be used for processes such as machine learning, computer vision, and natural language processing operations. A neural network may operate upon suitable input data (e.g. such as an image or sound data) to ultimately provide a desired output (e.g. an identification of an object within an image, or a spoken word within a sound clip, or other useful output inferred from the input data). This process is usually known as "inferencing" or "classification".

A neural network will typically process the input data (e.g. image or sound data) according to a network of operators, each operator performing a particular operation. The operations will generally be performed sequentially to produce desired output data (e.g. a classification based on the image or sound data). Each operation may be referred to as a "layer" of neural network processing.

Hence, neural network processing may comprise a sequence of "layers" of processing, such that the output from each layer is used as an input to a next layer of processing. FIG. 1 shows an exemplary sequence of layers of neural network processing from an initial input layer 101 to a final output layer 107, between which are layers comprising various convolutional layers (C-layers) 102, 103, 104, and fully-connected layers (FC layers) 105, 106.

The input layer 101 may be configured to receive input data (e.g. image or sound data), and to provide that input data in a suitable form (e.g. as an array of data elements, otherwise known as a "feature map") for use by subsequent neural network layers. The feature map will generally comprise a three-dimensional array of data elements, each data element having data associated therewith. The feature map may have a width (W), a height (H) and a depth (C), wherein the width (W) and height (H) may be defined as the number of data elements in the width and height direction respectively, and the depth (C) may correspond to a number of data channels. For example, in the case of input data comprising an image, the width and height of the array provided by the input layer may correspond to a number of data positions (e.g. pixels) along the width and height direction of the image respectively, whilst the channels may comprise the RGB channels of the image.

After the input layer, there may be one or more other layers of neural network processing (e.g. including convolutional layers, fully-connected layers, pooling layers, or any other layers of neural network processing that may be present).

Generally, each layer of neural network processing (e.g. such as a convolutional layer, fully-connected layer, or pooling layer) will process an input feature map (IFM) in order to generate a corresponding output feature map (OFM). The output feature map generated by a layer of neural network processing will be used as the input feature map for a next layer of neural network processing in the sequence, and so on. This is illustrated in FIG. 2.

As used herein, the term "feature map" may refer to either an input feature map or an output feature map.

The feature maps may be processed according to "batch processing", wherein plural (e.g. unrelated) feature maps are processed simultaneously.

As shown in FIG. 2, data of an input feature map (IFM) which is to be processed by a particular layer of neural network processing may be read from working memory (e.g. a buffer). The input feature map (IFM) may comprise data which has previously been written to the buffer as part of an output feature map (OFM) generated by a previous layer of the neural network processing.

The operation performed by each layer of neural network processing may comprise any suitable operation which manipulates an input feature map to provide an output feature map. The operation may require process parameters (e.g. such as weights for a filter or "kernel") which may be specific to a particular layer of neural network processing. Hence, as shown in FIG. 2, suitable process parameters (e.g. weights) may be read from working memory (e.g. a buffer) in order to perform each layer of neural network processing.

With reference to FIG. 1, the final layer of neural network processing in the sequence may comprise an output layer 107. The output layer may process an input feature map to generate useful output data (e.g. an inference or classification).

Hence, known neural network processing may comprise processing of input feature maps to provide associated output feature maps.

Notwithstanding this, the Applicants believe that there is scope to improve the manner in which feature maps and associated data is handled in neural networks.

BRIEF DESCRIPTION OF THE DRAWINGS

Various embodiments of the technology described herein will now be described by way of example only and with reference to the accompanying drawings, in which:

FIG. 8 provides a list of parameters which may be used in a command stream for defining a portion of an input feature map in terms of one or more tiles, and for mapping each tile to a set of memory locations from which data for the tile is to be read;

FIG. 9 provides a list of parameters which may be used in a command stream for defining a portion of an output feature map in terms of one or more tiles, and for mapping each tile to a set of memory locations to which data for the tile is to be written;

FIGS. 15(i) to (vii) provide examples of possible content of a buffer to which portions of an output feature map are written when performing a first layer of neural network processing, and from which portions of an input feature map are read for performing a second (next) layer of neural network processing, when using the arrangement of portions shown in FIG. 14.

Like reference numerals are used for like features in the drawings (where appropriate).

DETAILED DESCRIPTION

Figure 1:
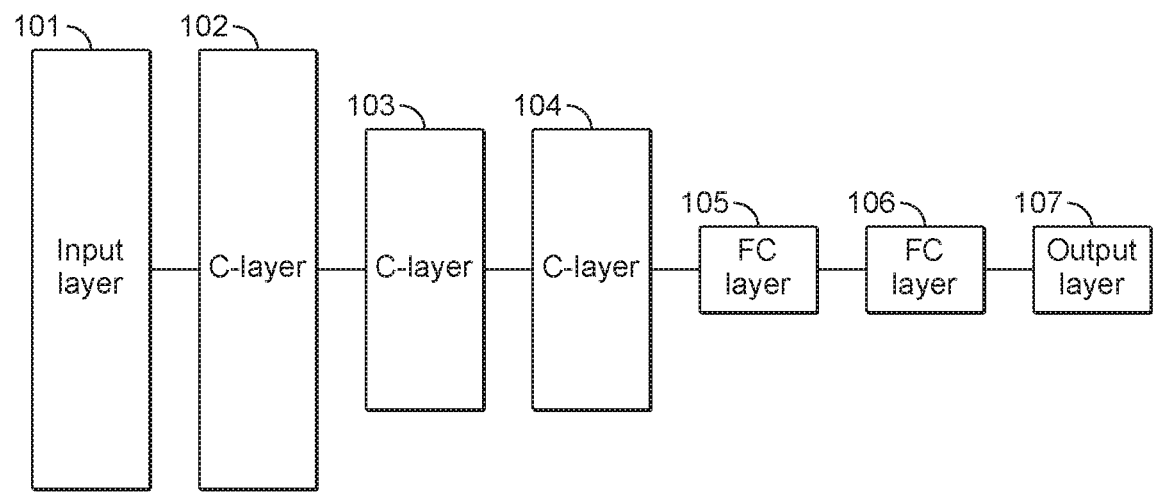
FIG. 1 shows an exemplary sequence of layers of neural network processing comprising an input layer and an output layer, between which are neural network layers comprising various convolutional layer (C-layer) layers and fully-connected layers (FC layer)

A first embodiment of the technology described herein comprises a method of controlling a processor operable to perform neural network processing in a data processing system comprising a processor operable to perform neural network processing and a memory for storing data to be used when performing neural network processing, the method comprising:

performing neural network processing for respective portions of an input feature map, each portion of the input feature map comprising an array of data elements, each data element having respective data associated therewith, each data element having an associated position within the input feature map; and when performing neural network processing for a portion of an input feature map:

defining the portion of the input feature map in terms of one or more tiles, wherein each tile corresponds to a respective region of the portion of the input feature map, each region corresponding to one or more positions of data elements within the array of data elements of the portion of the input feature map, wherein the tiles together form the entirety of the portion of the input feature map;

for each tile, providing information which allows each data element position forming the tile to be mapped to a respective memory location storing data for the data element associated with the position;

the method further comprising:

the processor, when fetching from memory data for a data element position within the portion of the input feature map, identifying which tile of the one or more defined tiles the position falls within, identifying a memory location from which to read data for the position using the provided information which allows each position forming the tile to be mapped to a respective memory location, and reading the data from the identified memory location; and the processor processing the fetched data for one or more data elements in the input feature map portion so as to provide a data element or elements for a corresponding portion of an output feature map.

A second embodiment of the technology described herein comprises a data processing system comprising:

a processor operable to perform neural network processing; and a memory for storing data to be used when performing neural network processing;

wherein:

the processor is configured to:

perform neural network processing for respective portions of an input feature map, each portion of the input feature map comprising an array of data elements, each data element having respective data associated therewith, each data element having an associated position within the input feature map; and the data processing system further comprises processing circuitry configured to:

define a portion of an input feature map to be processed in terms of one or more tiles, wherein each tile corresponds to a respective region of the portion of the input feature map, each region corresponding to one or more positions of data elements within the array of data elements of the portion of the input feature map, wherein the tiles together form the entirety of the portion of the input feature map; and for each tile, provide information which allows each data element position forming the tile to be mapped to a respective memory location storing data for the data element associated with the position;

and the processor is further configured to, when performing neural network processing for a portion of an input feature map:

when fetching from memory data for a data element position within the portion of the input feature map, identify which tile of the one or more defined tiles the position falls within, identify a memory location from which to read data for the position using the provided information which allows each position forming the tile to be mapped to a respective memory location, and read the data from the identified memory location; and process fetched data for one or more data elements in the input feature map portion so as to provide a data element or elements for a corresponding portion of an output feature map.

As discussed above, with regards to FIGS. 1 and 2, known neural network processing may comprise processing input feature maps to provide associated output feature maps, wherein data for the feature maps may be stored in working memory (e.g. a buffer) if desired (for example between layers of neural network processing).

However, the Applicants have recognised that, since the feature maps involved in neural network processing may have a considerable size, if a feature map is to be stored in its entirety (for example, between two successive layers of neural network processing) then a buffer of considerable size would be required.

Furthermore the Applicants have recognised that, depending on the particular neural network processing operation which is performed, the size of an output feature map generated by the neural network processing (e.g. comprising a layer of neural network processing) may be different compared to the input feature map from which it was generated. This is shown, for example in FIG. 3, where a feature map FM0 having an initial size H×W×C, is processed according to a layer performing an operation A to generate an output feature map FM1 having a size of H×W×2C, which is then processed by a next layer performing an operation B to generate an output feature map FM2 having a size H/2×W/2×2C. Hence, the size of the feature maps generated during neural network processing may vary. Indeed, if an entire feature map is to be stored between layers of neural network processing, then a relatively large amount of working memory may be required to be set aside in order to provision for possible changes to the size of the feature map during neural network processing.

The Applicants have recognised that one possibility for reducing the amount of working memory required when performing neural network processing is to process a feature map as a plurality of separate smaller portions, e.g. one after another. In this case, a first neural network processing operation (layer) may perform processing for and write to working memory (only) a portion of a feature map, and a next neural network processing operation (layer) may then perform processing using the portion of the feature map which has been written to working memory, and so on, with each separate portion of the feature map being processed in this manner. It is therefore not necessary to store an entire feature map in the working memory at the same time, and correspondingly a working memory may be provided which has a size smaller than the feature map.

Such processing of data for successive operations (layers) on the basis of portions such that an entire feature map is not stored between those successive operations (layers) may be referred to herein as "cascading" those operations.

Hence, in the technology described herein, input feature maps in neural network processing are processed as respective portions of the input feature map. Furthermore, in order to facilitate the reading of the relevant input feature map portions from memory, e.g. such as a working (buffer) memory, each portion of the feature map is defined in terms of one or more tiles, which tiles can then be mapped to corresponding memory locations to allow the data for the portion of the input feature map to be read.

In particular, each tile describes a region of an input feature map corresponding to one or more positions of data elements within the portion of the input feature map. When reading data for the portion of the input feature map from memory, each data element position forming a tile is mapped to a corresponding location in memory. In this manner, the one or more positions forming a tile are mapped to a set of one or more (corresponding) locations in memory from which data is to be read.

Defining a portion of a feature map in terms of one or more tiles in the manner of the technology described herein can provide a degree of flexibility when reading data from a working (buffer) memory. For instance, the set (or sets) of memory locations from which data is to be read can be altered by defining fewer or more tiles, by selecting the size of the defined tile(s), and by selecting an appropriate mapping of the positions forming the tile to memory locations. As will be discussed below, this may be useful for (and indeed may permit) situations where a relatively small working (buffer) memory is provided, and further wherein the working (buffer) memory is managed in a manner that accounts for filter margins.

For example, the Applicants have recognised that, when processing feature maps on the basis of portions, an input feature map portion which is to be processed by neural network processing may comprise data from more than one output feature map portion previously generated as a result of neural network processing. For example the input feature map portion may comprise data from two or more previously generated output feature map portions which are adjacent (bordering) one another within the output feature map. This situation may arise when an input feature map portion is to be processed according to neural network processing comprising a filter operation, such that at least some of the data which is to be read from the working (buffer) memory for the input feature map portion comprises a filter margin.

The Applicants have recognised that, in such situations, it may be desirable to manage a working (buffer) memory such that data for a newly generated output feature map portion does not necessarily entirely overwrite data stored from a previously generated output feature map portion. For example, it may be desirable to store a newly generated output feature map portion such that at least some of the data at (or near) a border between the newly generated output feature map portion and a previously generated adjacent output feature map portion is not overwritten (such that a filter margin is maintained (preserved) in the working (buffer) memory for use when reading an input feature map portion from the working (buffer) memory). It may be allowable, however, for data for the newly generated output feature map to overwrite previously generated data which is no longer needed for processing as input feature map portions (such as data which does not contribute to a filter margin, for example).

Hence the Applicants have recognised that, in some situations, it may not be suitable to allow a newly generated output feature map portion data to simply overwrite an entire previous output feature map portion within the working (buffer) memory. Thus, it may be desirable to distribute data for a newly generated output feature map portion across plural sets of memory locations within the working (buffer) memory in order to 'fit around' any existing data which still needs to be retained in the working (buffer) memory (for example, to retain data at or near a border of a previously generated output feature map portion which is adjacent within the output feature map, which is to form a filter margin to be read when processing an input feature map portion). As a result, data which is to be read for an input feature map may likewise be distributed across plural sets of memory locations. In this regard, the tiles of the technology described herein allow data to be read (for an input feature map portion) from plural sets of memory locations, by defining a suitable number of tiles having a suitable size, and mapping those tiles to plural sets of memory locations.

Thus, the tiles of the technology described herein may permit the working (buffer) memory to be managed in a manner that accounts for filter margins.

Furthermore, the tiles of the technology described herein can allow the working (buffer) memory to be managed such that a relatively small working (buffer) memory can be provided and yet still account for filter margins. For instance, as a result of the tiles allowing data of output feature map portions (and likewise data of input feature map portions) to be written to (or read from) plural sets of memory locations in a relatively flexible manner, it is not necessary to provide a working (buffer) memory which is large enough to store a majority of (or an entire) feature map.

The input feature map may comprise any suitable feature map (wherein the term "input" merely identifies the feature map as a feature map which is to be read from memory for processing according to neural network processing).

The neural network processing for the portion of the input feature map may comprise a layer of neural network processing. This layer of neural network processing may be "cascaded" with a previous layer of neural network processing, as discussed above, such that both layers of neural network processing are performed on the basis of portions. Accordingly, the portion of the input feature map which is to be processed may correspond to at least part of a portion of an output feature map which has been written to the memory when performing a previous layer of neural network processing.

The input feature map comprises an array of data elements, each data element having respective data associated therewith, each data element having an associated position within the input feature map. The input feature map may comprise a rectangular array of positions of data elements. The input feature map may have a width (in a horizontal, x, direction) corresponding to a number of data elements in the width direction, and a height (in a vertical, y, direction) corresponding to a number of data elements in they direction. The input feature map may comprise plural arrays of data elements, each array forming a channel of the input feature map, such that the input feature map has a depth corresponding to the number of channels of the input feature map.

The (and each) portion of the input feature map that is handled in the manner of the technology described herein comprises an array of data elements which is a sub-set of the array of data elements that form the input feature map (so comprises some but not all of the input feature map). Each data element forming the portion of the input feature map has an associated position within the portion of the input feature map. The portion of the input feature map may comprise an array of positions of data elements, in an embodiment a rectangular array of positions of data elements. The portion of the input feature map may have a width (in the x direction) and a height (in the y direction) corresponding to a number of data elements in the width direction and height direction respectively. The portion of the feature map is smaller than the input feature map. Hence, at least one of (and in an embodiment both of) the width and the height of the portion of the input feature map are less than the width and the height of the input feature map respectively.

When performing processing for the portion of the input feature map, the portion of the feature map is defined in terms of one or more tiles. Hence, the portion of the feature map is divided into one or more defined tiles.

Each tile should, and in an embodiment does, correspond to contiguous region of the portion of the input feature map, comprising one or more contiguous positions of data elements within the portion of the input feature map. Each tile may be rectangular. Each tile will have a width (in the x direction of the tile) and a height (in the y direction of the tile) corresponding to a number of data elements forming the tile in the width direction and height direction respectively of the tile. In an embodiment the width (x) direction and the height (y) direction of the tile are aligned with the width (x) direction and the height (y) direction of the input feature map.

The one or more tiles together form the entirety of the portion of the input feature map. Hence, each data element forming the portion of the input feature map is located within at least one tile (and in an embodiment only one tile, such that the tiles do not overlap one another). The one or more tiles making up the portion of the input feature map in an embodiment have a predefined layout (positions relative to one another) across (within) the portion of the input feature map. (Alternatively, information may be provided which defines the relative positions of the tiles within the portion of the input feature map.) The number of tiles which are defined for use by the processor when performing processing of a portion of an input feature map may vary (for example, depending on how the portion of the input feature map is stored in memory). In an embodiment, the number of tiles which can be defined may vary up to a predetermined maximum number of (permitted) tiles. In an embodiment the maximum number of tiles is four tiles (however, other maximum numbers of tiles could be used, such as 2, 3, 5, 6, 7, 8 . . . etc., or an even number such as 2, 6, 8 . . . etc., if both the tiles and the portion of the input feature map are rectangular). In this regard, the Applicants have recognised that a maximum of 4 tiles may be sufficient when performing processing of feature maps on the basis of portions (even when feature map portions are distributed in the working (buffer) memory in a manner which accounts for filter margins).

The one or more tiles which are to be used for an input feature map portion may be defined in any suitable and desired manner, e.g. using any suitable and desired parameters (variables).

The one or more tiles are in an embodiment defined by providing information from which the dimensions of each tile can be derived (obtained). In embodiments, the tiles are rectangular, and the information allows a height and a width of each tile which is to be used to be derived (obtained). As discussed above, the height and the width may correspond to a number of positions of data elements in the height and the width direction respectively of the tile.

In an embodiment constraints are imposed on the height and/or width of the available tiles relative to one another, such that it is not necessary to define explicitly the height and width of every tile which is to be used for the portion of the input feature map. In an embodiment, the processor may infer a height of one or more of the tiles to be used from a defined height of another tile and/or from a defined height of the portion of the input feature map. Alternatively or additionally the processor may infer a width of one or more of the tiles to be used from a defined width of another tile and/or from a defined width of the portion of the input feature map. In one embodiment, the one or more tiles have a defined (in an embodiment predefined) layout across the portion of the input feature map comprising one or more columns of tiles. In such an embodiment, constraints are in an embodiment imposed upon the height and width of the one or more tiles, such that tiles within the same column have the same width relative to one another (corresponding to a width of the column). In an embodiment, tiles within different columns can (are permitted to) have different widths relative to one another (such that the width of each column may differ). In an embodiment, the one or more tiles are defined such that tiles within a same column can (are permitted to) have different heights relative to one another.

In an embodiment, the one or more tiles are defined such that (adjacent or in an embodiment any) tiles within different columns can (are permitted to) have different heights relative to one another (for example, the heights of tiles independently may be set independently for each column). In an embodiment, when a maximum of four tiles are available to be defined, the tiles comprise at most two columns of tiles, each column comprising at most two tiles.

As noted above, by imposing constraints on the height and/or width of tiles relative to one another, the data processing system does not necessarily have to define a height and/or width of every tile which is being defined (since the height and/or width of some tiles may be inferred from the height and/or width of other tiles).

Furthermore, the Applicants have recognised that a configuration using columns of tiles (such as discussed above) may be effective for reading a portion of an input feature map from a working (buffer) memory in situations where the working (buffer) memory is managed as a rolling buffer which rolls in both the vertical (y) and horizontal (x) directions, and which introduces a vertical offset when rolling in the horizontal direction (but does not introduce any horizontal offset when rolling in the vertical direction). For instance, the Applicants have recognised that, when a working (buffer) memory is managed in this manner, then the data for an input feature map portion tends to be distributed across one or more sets of memory locations which can each be mapped using a tile, even when imposing the constraint that the tiles (when 'pieced together' to form the input feature map) have a layout comprising one or more columns having the constraints discussed above.

In an alternative such embodiment, the one or more tiles have a defined (in an embodiment predefined) layout across the portion of the input feature map comprising one or more rows of tiles. In such an embodiment, constraints are in an embodiment imposed upon the height and width of the one or more tiles, such that tiles within the same row have the same height relative to one another (corresponding to a height of the row). In an embodiment, tiles within different rows can (are permitted to) have different heights relative to one another (such that the height of each row may differ). In an embodiment, the one or more tiles are defined such that tiles within a same row can (are permitted to) have different widths relative to one another. In an embodiment, the one or more tiles are defined such that (adjacent or in an embodiment any) tiles within different rows can (are permitted to) have different widths relative to one another (for example, the widths of tiles may be set independently for each row). In an embodiment, when a maximum of four tiles are available to be defined, the tiles comprise at most two rows of tiles, each row comprising at most two tiles.

The Applicants have recognised that a configuration using rows of tiles (such as discussed above) may be effective for reading a portion of an input feature map from a working (buffer) memory in situations where the working (buffer) memory is managed as a rolling buffer which rolls both the vertical (y) and horizontal (x) directions, and which introduces a horizontal offset when rolling in the vertical direction (but does not introduce any vertical offset when rolling in the horizontal direction). For instance, the Applicants have recognised that, when a working (buffer) memory is managed in this manner, then the data for an input feature map portion tends to be distributed across one or more sets of memory locations which can each be mapped using a tile, even when imposing the constraint that the tiles (when 'pieced together' to form the input feature map) have a layout comprising one or more rows having the constraints discussed above.

Thus, in an embodiment, the information that is provided to the processor to define the tiles making up the portion of the input feature map comprises an overall height and an overall width for the portion of the input feature map (in an embodiment in terms of the number of data element positions in the respective direction), together with either: a width for each column of tiles except for the last column (which last column width can be inferred from the width of the feature map portion and the widths of the other columns), and, for each column, a tile height for each tile except for the final tile in the column (which final tile height can again be determined from the overall height of the input feature map portion and the heights of the other tiles in the column); or a height for each row of tiles except for the last row (which last row height can be inferred from the height of the feature map portion and the heights of the other rows), and, for each row, a tile width for each tile except for the final tile in the rows (which final tile width can again be determined from the overall width of the input feature map portion and the widths of the other tiles in the row).

Thus, in embodiments where a maximum of four tiles are available to be defined for reading a portion of an input feature map from memory, the tiles having a layout across the input feature map portion comprising up to two columns, the information that is provided to the processor to define all four tiles comprises: a height of the portion of the input feature map, a width of the portion of the input feature map, a width of a single tile (corresponding to the width of a column containing that tile), and a height of a single tile in each of the columns. The processor is configured to infer the heights and widths of any tiles which are not explicitly defined from this information. If fewer than the maximum four tiles are to be defined, the information provided to the processor will comprise a selection of this information, as appropriate.

In an alternative embodiment where a maximum of four tiles are available to be defined for reading a portion of an input feature map from memory, the tiles having a layout across the input feature map portion comprising up to two rows, the information that is provided to the processor to define all four tiles comprises: a height of the portion of the input feature map, a width of the portion of the input feature map, a height of a single tile (corresponding to a height of a row containing that tile), and a width of a single tile in each of the rows. The processor is configured to infer the heights and widths of any tiles which are not explicitly defined from this information. If fewer than the maximum four tiles are to be defined, the information provided to the processor will comprise a selection of this information, as appropriate.

Where the input feature map portion includes plural data channels, then the processor is in an embodiment also provided with an indication of the relevant depth (i.e. number of channels) of the input feature map portion.

As noted above, the one or more tiles making up the portion of the input feature map in an embodiment have a predefined layout (positions relative to one another) across (within) the portion of the input feature map. For example, in the case where a maximum of four tiles are available for use, the first, second, third and fourth tiles may correspond to the upper-left-most, upper-right-most, lower-left-most, and lower-right most tiles. The relative positions (layout sequence) of the tiles is in an embodiment maintained regardless of the number of tiles which are defined for an input feature map portion, and regardless of the exact size (height and width) of each of the tiles. (Alternatively, information may be provided which defines the relative positions (layout sequence) of the tiles within the portion of the input feature map). Hence, it is not necessary to provide information specifying a particular (exact) position of a tile within the portion of the input feature map (since the position of the tile will depend on the (predefined) layout sequence of the tiles and the sizes of the tiles).

As noted above, the one or more tiles are defined so as to span the entire input feature map portion, such that each and every data element position within the input feature map falls within (only) a single tile. In this regard, each data element may be considered not only to have a position within the input feature map portion, but also to have a position within a tile.

In an embodiment, each tile has a base (reference) position within the tile, such that each data element forming the tile has (can be identified according to) a position within the tile measured (counted) relative to the base (reference) position of the tile. In an embodiment, the position of a data element within the tile corresponds to a number of data positions from the base (reference) position of the tile.

The base (reference) position within a tile is in an embodiment a particular, in an embodiment selected, in an embodiment predefined position in or relative to the tile, such as a corner, such as the upper-left most corner, of the tile.

The base (reference) position for a (and each) tile may be explicitly defined, e.g. by means of a suitable indication in an instruction stream. However, in an embodiment, the base (reference) position for each tile is predefined, and so does not need to be explicitly indicated to the processor. In an embodiment the base (reference) position for a (and each tile) is predefined as being a corner (and in an embodiment the upper left corner) of the tile.

In an embodiment, the base (reference) position of the tile is an origin of an x,y coordinate system for the tile. Accordingly, in an embodiment each data element forming a tile has (can be identified according to) an x,y position of the data element relative to the origin of the tile, wherein the x,y position of the data element corresponds to a number of data element positions from the origin to the data element in question in the x and y directions of the tile respectively.

In an embodiment, the x and y directions of the tile correspond to (align with) the x and y directions of the portion of the input feature map respectively. Hence, a data element having an x, y position within a portion of the input feature map may (additionally) be identified by an x,y position within the tile in which the data element in question falls relative to the origin of said tile.

The one or more defined tiles are used when reading a portion of an input feature map from memory, by mapping positions within each defined tile to a corresponding set of memory locations from which data is to be read. In particular, information is provided which allows each position within a tile to be mapped to a respective memory location storing data for the data element associated with the position. The information which is provided which allows each position within a tile to be mapped to a respective memory location may be defined in any suitable and desired manner, e.g. using any suitable and desired parameters (variables).

The information that is provided to allow each position forming a tile to be mapped to a respective memory location (memory address) storing data for the data element associated with that position can comprise any suitable and desired information that can allow positions within a tile to be mapped to a respective memory location (memory address) storing data for the data element associated with that position.

The information which is provided in an embodiment comprises information which allows the base (reference) position for (within) the tile to be mapped to a "base" memory location (address) storing the data for the data element which is located at the base (reference) position for the tile. This information is in an embodiment provided in the form of a (base) memory location (address) for the base (reference) position for the tile. The information which is provided in an embodiment then further comprises information which allows the relative position of a data element within a tile (relative to the base (reference) position of that tile) to be used to identify a memory location (address) for the data for that data element position in memory. In an embodiment, the information comprises information which allows the location in memory for the data for the data element position to be determined (as an offset) relative to the base memory location (address) for the tile based on the position of the data element within the tile relative to the base position for the tile.

Thus, in an embodiment, the information which is provided to allow each position forming a tile to be mapped to a respective memory location comprises information indicative of a stride (memory address spacing) between data corresponding to adjacent data element positions within the tile. The information indicative of a stride (memory address spacing) can thus be used in combination with a relative position of a data element within the tile so as to identify a memory location storing data for that data element (for example, by using the information indicative of a stride to scale the position of a data element within a tile relative to the base (reference) position of the tile in order to obtain a location in memory for data for that data element relative to the base memory address of the tile). The information indicative of a stride in memory between (the data for) adjacent data elements within the tile thus in an embodiment comprises information indicative of a stride in at least one of (and in an embodiment a (separate) stride for each of) the horizontal (x) direction (so the memory spacing for each (position) "step" in the horizontal direction in the tile) and the vertical (y) direction (so the memory spacing for each (position) step in the vertical direction in the tile). The stride can indicate the appropriate (relative) memory address spacing using any suitable and appropriate desired unit of memory space, such as, and in an embodiment, as a number of bytes.

In embodiments where the feature map comprises multiple channels, the information which is provided to allow each position forming a tile to be mapped to a respective memory location may further comprise information indicative of a stride (memory address spacing) between data elements having the same horizontal and vertical position within a feature map, but having a depth within the feature map corresponding to adjacent channels of the feature map (in other words, a "channel stride").

In embodiments, the channels of a feature map may be split into (divided among) plural groups (referred to herein as "blocks"), wherein data for each group of channels is stored in a different region of memory (which can allow for ease and efficiency of accessing data when a feature map comprises a large number of channels, for example). For example, the channels may be split into groups ("blocks") which each consist of 16 channels. Thus (the start of) each group ("block") of channels may be spaced apart in memory by a stride (referred to herein as a "block stride"). In such situations, data for data elements having a same horizontal and vertical position within a feature map, but having a depth which differs by the number of channels in the group ("block") (e.g. 16 channels) will be spaced apart in memory by the "block stride". In such embodiments, wherein the channels of a feature map are split into blocks for storage in memory, the information which is provided to allow each position forming a tile to be mapped to a respective memory location may further comprise information indicative of the "block stride". In embodiments, plural feature maps (corresponding to a "batch" of feature maps) may be processed simultaneously, for example such that a first (same) portion is processed for each feature map in the batch before a next portion is processed for a next feature map in the batch. In such embodiments, the information which is provided to allow each position forming a tile to be mapped to a respective memory location may comprise information indicative of a stride (memory address spacing) between batches in memory (for example, between data elements having the same horizontal and vertical position and falling within the same channel but falling within successive feature maps which are to be processed). Such a stride may be referred to herein as a "batch stride".

Thus, in an embodiment, the information that is provided to the processor to allow each position in a tile to be mapped to a respective memory location storing data for the tile position comprises a memory address (a base memory address) for a base (origin) position for the tile, together with the stride between the memory locations for data positions along the horizontal direction in the tile and the stride between the memory locations for data positions along the vertical direction in the tile. When the feature map comprises multiple channels, information is also provided comprising a channel stride (and optionally a block stride), and when the feature maps are processed according to batches information is also provided comprising a batch stride.

As will be discussed in greater detail below, the horizontal and vertical strides can be used to scale a relative position of a data element within a tile (relative to the base (reference) position of that tile) so as to obtain a relative position (offset) in memory (relative to the base memory address of the tile). The offset in memory relative to the base memory address of the tile may further be adjusted to account for the channel and/or block and/or batch in which the data element falls (by adding a further offset based on the channel stride and/or block stride and/or batch stride). The effect of this is that a tile can be used to read data for data elements stored in a set of memory locations each having an offset in memory which is derivable from a base memory address for the tile, and an appropriately scaled position of a data element within the tile (relative to a base position of the tile) (and also accounting for any of a channel, block and batch if applicable).

In an embodiment, the same strides (stride values) are used for all the tiles making up the input feature map portion, but each tile has its own, separate, indicated and provided, base position memory address. The stride values used may, however, be different for different feature maps and/or for different feature map portions to be processed by neural network processing.

In the case where an input feature map can be formed of up to a particular, maximum, number of tiles, then in an embodiment a base memory address could be provided for each of the maximum number of tiles that can be used, with any tiles that are not in fact defined for the input feature map (i.e. that don't contain data for the input feature map), then having a base address that indicates that, such as a null-base address, or a (duplicated) base address that corresponds to one of the other tiles.

However, in an embodiment a base memory address is provided for each (and only for each) tile that is actually being used (defined) for the input feature map portion in question. In such an embodiment, it is not necessary to provide a base address of any tile which is not to be used (defined) for reading data for the input feature map portion in question.

In an embodiment, the base memory address provided for the tile is indicated as an offset relative to some other memory address (wherein said other memory address can be set independently of the base memory address for the tile, for example by a driver or compiler at runtime). Hence, when a data element position within a tile is mapped to a memory address location, a memory address spacing relative to the base memory address of the tile is determined (which is in turn specified relative to said other memory address). Accordingly, if said other memory address is altered (for example by the driver or compiler), then any defined tiles will map to a different region of memory. In this manner, the memory locations to which data element positions within a defined tile are to be mapped are relocatable by altering said other memory address (wherein said relocation occurs without altering the definition of the tiles, such that any instructions which have been issued to define the tiles, for example within a command stream, remain valid despite the relocation). Other arrangements would, of course, be possible.

The information which defines the tile or tiles for the input feature map is used together with the information which allows each position forming a tile to be mapped to a respective memory location, in order to fetch data corresponding to the portion of the input feature map for processing.

To do this, for a position within the portion of the feature map to be processed, the processor identifies which of the one or more defined tiles comprise the position (the position falls within (belongs to)), and then identifies the memory location from which to read data for the position using the provided information which allows each position forming a tile to be mapped to a respective memory location, and reads the data from the identified memory location (address).

The position of a data element within the input feature map portion for which data is to be read from memory can be indicated and defined using any suitable variables, such as, and in an embodiment, a horizontal (x) position and a vertical (y) position of the data element within the portion of the feature map.

To read the data for a data element within the portion of the input feature map, the processor first identifies which of the defined tiles the data element falls within. The processor may identify which of the defined tiles the data element falls based on one or more of, and in an embodiment both: the (relative) position of the data element within the portion of the feature map; and the dimensions of one or more of the defined tiles.

When identifying which tile a position of a data element falls within, the processor in an embodiment considers the tiles according to a particular, in an embodiment selected, in an embodiment predefined order. If it is determined that the position does not fall within a given tile, then the processor will consider the next tile according to the order, and so on. In an embodiment, the processor compares the position of the data element against the dimensions (e.g. the height and/or width) of a first tile, to determine whether the data element falls within the first tile. The first tile is in an embodiment located at a corner of the portion of the input feature map (e.g. being the upper-left-most tile of the defined tiles). If the data element does not fall within the first tile, the processor may determine whether the position of the data element falls within a second tile of the defined tiles, e.g. which may be adjacent to the first tile in the horizontal or vertical direction, and so on for the third, fourth tiles, etc., if needed. In an embodiment the processor considers the tiles on a row-by-row basis (so all the tiles in one row are considered in turn, before moving to the next row and considering all the tiles in that row (and so on)), or on a column-by-column basis.

The processor in an embodiment also determines the relative position (relative to the base position for the tile) of the data element within the tile in which it falls. For example, and in an embodiment, the processor may set (and if necessary modify) the x,y, variables describing the position of the data element within the portion of the feature map so that they correspond instead to an x,y position within the tile.

For example, in the case where the tiles are arranged as up to two columns (as discussed above), the processor may compare the (horizontal (x)) position of a data element against the width of a first (e.g. left-most) column to determine whether the position falls within that first column. If the data element falls within the first column, the processor may then identify in which tile within the column the position of the data element falls (using the vertical (y) position of the data element) (and may modify the variable describing the vertical (y) position of the data element so that it represents a relative position within the identified tile). If the data element does not fall within the first column, the processor may identify in which tile within the second column the position of the data element falls (and may adjust the variables describing the horizontal (x) and/or vertical (y) positions of the data element so that they represent a relative position within the identified tile).

Correspondingly, in the case where the tiles are arranged as up to two rows (as discussed above), the processor may compare the (vertical) position of a data element against the height of a first (e.g. upper-most) row to determine whether the position falls within that first row. If the data element falls within the first row, the processor may then identify in which tile within the row the position of the data element falls (and may adjust the variable describing the horizontal (x) position of the data element so that it represents a relative position within the identified tile). If the data element does not fall within the first row, the processor may identify in which tile within the second row the position of the data element falls (and may adjust the variables describing the horizontal (x) and/or vertical (y) positions of the data element so that they represent a relative position within the identified tile).

Once the processor has identified which tile the input feature map data position in question falls within, the processor will then use the information mapping the data positions within the tile to memory locations to determine the memory location (address) from which to read the data for the data element (position) in question. This can be done in any suitable and desired manner, e.g., and in an embodiment, in accordance with the information that is provided to map the data positions within the tile to the memory locations.

Thus, in an embodiment, this operation uses the relative position of the data element in the tile (which is in an embodiment determined as discussed above) to determine (identify) the memory location for the data for that data position, in an embodiment based on a provided indication of a base memory location (address) for the base position for the tile, together with the indicated stride(s) for the data positions.

Accordingly, the processor in an embodiment multiplies (scales) the relative spacing of the data position in the tile from the base position in the tile in the x direction by the corresponding memory address stride provided to the processor for the x direction and correspondingly multiplies (scales) the relative spacing of the data position in the tile from the base position in the tile in the y direction by the corresponding memory address stride provided to the processor for the y direction, to determine the memory location (offset) for the data for the data element position in question relative to the base memory address of the tile. In an embodiment, the scaled relative spacings in the x and y direction are summed in order to obtain the memory location (offset) for the data for a data element relative to the base memory address of the tile.

When the input feature map comprises multiple channels, optionally wherein the channels are divided into plural blocks, the memory location (offset) for the data for a data element position is obtained by additionally summing an offset to account for the channel in question, and optionally summing an offset to account for the block in question. The offset for the channel in question is obtained by multiplying (scaling) a value indicative of a channel in which the data element position in question falls by the stride between channels (the "channel stride"). The offset for the block is obtained by multiplying a value indicative of a block in which the data element in question falls by the stride between blocks (the "block stride").

When plural input feature maps are processed as a batch, the memory location (offset) for the data for a data element position is obtained by additionally summing an offset to account for the batch in question. The offset for the batch in question is obtained by multiplying (scaling) a value indicative of a batch in which the data element position in question falls by the stride between batches (the "batch stride").

Thus, in an embodiment, the processor identifies the memory location from which to read data for a data element of the portion of the input feature map by: identifying which of the defined tiles for the portion of the input feature map the data element falls within; identifying a relative position of the data element within that tile relative to a base position for the tile; identifying a memory location corresponding to the base position of the tile; and using the relative location of the data element within the tile relative to the base position for the tile, together with identified memory location corresponding to the base position of the tile, to determine a memory location which stores data for the data element in question.

The above describes the operation for fetching a data value for a given data element of the input feature map. The processor will correspondingly fetch the data values for as many different data elements in the input feature map portion as are needed to be processed, e.g. together, to generate an appropriate data element or elements of a corresponding output feature map portion.

This process is in an embodiment repeated for the entire portion of the input feature map, so as to generate an appropriate and corresponding portion of an output feature map.

Thus the processor in an embodiment reads the data in from memory for (all) the data elements of the input feature map portion in the manner discussed above in an appropriate order across and within the portion of the input feature map, to thereby generate a corresponding output feature map portion (and will repeat the above steps for each data element within the portion of the input feature map, until the entire portion of the input feature map has been read from memory and processed).

As noted above, in the technology described herein, the neural network processing comprises processing a feature map on the basis of portions. Thus, once the above steps have been performed for reading and processing a first portion of an input feature map from memory, they may be, and are in an embodiment, performed again when reading and processing a next portion of the input feature map from memory. Hence, the process is in an embodiment repeated for each portion of the (overall) input feature map in turn, until the entire input feature map has been read from memory and processed on the basis of portions.

Correspondingly, an output feature map will be generated by generating respective portions of the output feature map from the respective portions of the input feature map. The neural network processing that is being performed on and in relation to the portion of the input feature map can comprise any suitable and desired neural network processing that generates a portion of an output feature map from a portion of an input feature map. Thus the neural network processing in an embodiment comprises a layer of neural network processing, such as a convolutional or pooling layer. The neural network processing in an embodiment comprises applying one or more filters (e.g. weights) to the portion of the input feature map in order to generate a portion of an output feature map. In this latter case therefore, the processor will read in an appropriate window (kernel) of data elements from the input feature map portion to which an appropriate filter is to be applied, to thereby generate a corresponding output feature map data element or elements.

The neural network processing may be part of an inferencing or classification process. As such, the (portions of the) output feature map may comprise data which can be used (directly or after processing by one or more further layers of neural network processing) for inferencing or classification. The inferencing or classification may comprise inferring or classifying features which were present within input data for the neural network processing (e.g. such as an identification of an object within an image, or a spoken word within a sound clip, or other useful output inferred from the input data). Hence, the neural network processing performed by the technology described herein may contribute to producing a useful output.

The input and output feature map portions may be configured as desired, but in an embodiment the portions for the input feature map (and correspondingly the output feature map) are each rectangular. The input feature map (and correspondingly the output feature map) may comprise plural columns and/or plural rows of portions. Each portion of the input feature map may be processed by neural network processing to provide a corresponding portion of the output feature map. Hence, the output feature map may have the same number of portions as the input feature map, in an embodiment having the same number of rows and/or columns of portions as the input feature map.

In embodiments of the technology described herein, the input feature map (and correspondingly the output feature map) comprises two columns of portions, wherein each column may comprise multiple rows of portions. However, the input feature map (and correspondingly the output feature map) can (and in embodiments does) comprise more than two columns of portions.

The portions of the input feature map may not necessarily be the same size as the portions of the output feature map, for example, depending on the neural network operation (e.g. filter) which is applied to the input feature map portions to generate the output feature map portions.

The size of any particular (or each) input feature map portion may depend on the data which is available (in the working (buffer) memory) for processing as an input feature map portion (e.g. depending on available data forming a filter margin). The (horizontal and/or vertical) size of the input feature map portions may therefore differ from one another.

The portions of the input feature map may be read from memory and processed according the neural network processing in turn. The portions of the input feature map may be read from memory and processed according the neural network processing according to a particular, e.g. predetermined, order (such that the corresponding portions of the output feature map are generated according to the order).

In one embodiment, the input feature map comprises plural rows and/or columns of portions (in an embodiment two columns of portions, however other numbers of columns are also possible), and the portions of the input feature map are read from memory and processed row-by-row (such that the corresponding portions of the output feature map are generated row-by-row). In this case, a first portion of the input feature map to be processed may be a first (left-most) portion of a first (upper-most) row of the portions which form the input feature map. The portions which form the first (upper-most) row may be processed in turn (from left to right along the row). Once the portions which form the first row have each been processed, the next row of portions may be processed, and so on, until the entire input feature map has been processed.

In this case, when reading and processing the portions of the input feature map row-by-row, the one or more tiles for each portion in an embodiment comprise one or more columns of tiles wherein tiles within the same column have the same width. As discussed above, in this case, it may be appropriate to manage the memory (from which the portions of the input feature map are read) such that the memory rolls in the horizontal direction (x) and the vertical (y) direction, and introduces a vertical offset when rolling in the horizontal direction).

In an alternative embodiment, the input feature map comprises plural rows and/or columns of portions (in an embodiment two columns of portions, however other numbers of columns are also possible), and the portions of the input feature map are read from memory and processed column-by-column (such that the corresponding portions of the output feature map are generated column-by-column). In this case, a first portion of the input feature map to be processed may be a first (upper-most) portion of a first (left-most) column of the portions which form the input feature map. The portions which form the first (left-most) column may be processed in turn (from top to bottom along the column). Once the portions which form the first column have each been processed, the next column of portions may be processed, and so on, until the entire input feature map has been processed.

In this case, when reading and processing the portions of the input feature map column-by-column, the one or more tiles for each portion in an embodiment comprise one or more rows of tiles wherein tiles within the same row have the same height. As discussed above, in this case, it may be appropriate to manage the memory (from which the portions of the input feature map are read) such that the memory rolls in the horizontal direction (x) and the vertical (y) direction, and introduces a horizontal offset when rolling in the vertical direction).

As noted above, the number of tiles which are defined in order to allow the data for a portion of the input feature map to be read from memory may depend on the distribution in memory of data for the portion of the input feature map. For example, there may be enough space in the memory such that a first portion of an input feature map may be stored as a set of memory locations from which can be read by defining only one (a single) tile. A later portion, however, may require plural tiles to be defined in order to read the data for that portion (e.g. if the data for that portion is distributed in memory in a way that preserves filter margins needed when performing neural network processing). The parameters defining the tiles to be used (and defining the mapping of positions within each tile to a memory location) are thus in an embodiment set (updated) for each portion of the input feature map which is to be read from memory.

Thus, in an embodiment, the operation in the manner of the technology described herein is performed for plural successive input feature map portions, with each portion having its own defined layout of one or more tiles and corresponding mapping of the tile positions to memory locations. In an embodiment at least some of the input feature map portions have different numbers of tiles to each other.

The above discusses the defining and use of input feature maps on a portion-by-portion basis in the manner of the technology described herein.

The Applicants have recognised that a corresponding operation can be used when writing an output feature map to memory on a portion-by-portion basis, for example in the situation where there may be cascading operations in which an output feature map from one neural network layer is to act as an input feature map for a next neural network layer.

Again, the use of tiles in the manner of the technology described herein when writing a portion of an output feature map to memory may facilitate using a smaller amount of (working) memory for storing (the portions of) the output feature map than would otherwise be possible (e.g. whilst preserving desired filter margins).

Thus, in an embodiment, the operation in the manner of the technology described herein discussed above relating to the handling of input feature maps for neural network processing is correspondingly used for handling and when generating and storing output feature maps during neural network processing.

Thus, in an embodiment, the method of the technology described herein further comprises (and the processor and data processing system is configured to):

when performing neural network processing to generate data for a portion of an output feature map from a corresponding portion of an input feature map, the portion of the output feature map comprising an array of data elements, each data element having respective data associated therewith, each data element having an associated position within the output feature map;

defining the portion of the output feature map in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map;

for each tile, providing information which allows each position forming the tile to be mapped to a respective memory location to which data is to be stored for the data element associated with the position; and the processor, when writing to memory data corresponding to a data element of the portion of the output feature map, identifying which of the one or more defined tiles comprise the position, identifying a memory location to which to write data for the position using the provided information which allows each position forming the tile to be mapped to a respective memory location, and writing the data to the identified memory location.

The technology described herein also extends to such output feature map operation per se.

Thus, an embodiment of the technology described herein comprises a method of controlling a processor operable to perform neural network processing in a data processing system comprising a processor operable to perform neural network processing and a memory for storing data to be used when performing neural network processing, the method comprising:

performing neural network processing to generate respective portions of an output feature map, each portion of the output feature map comprising an array of data elements, each data element having respective data associated therewith, each data element having an associated position within the output feature map; and when performing neural network processing to generate a portion of an output feature map:

defining the portion of the output feature map in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map;

for each tile, providing information which allows each data element position forming the tile to be mapped to a respective memory location for storing data for the data element associated with the position;

the method further comprising:

the processor, when storing in memory data for a data element position within the portion of the output feature map, identifying which tile of the one or more defined tiles the position falls within, identifying a memory location at which to store data for the position using the provided information which allows each position forming the tile to be mapped to a respective memory location, and storing the data at the identified memory location.

An embodiment of the technology described herein comprises a data processing system comprising:

a processor operable to perform neural network processing; and a memory for storing data generated when performing neural network processing;

wherein:

the processor is configured to:

perform neural network processing to generate respective portions of an output feature map, each portion of the output feature map comprising an array of data elements, each data element having respective data associated therewith, each data element having an associated position within the output feature map; and the data processing system further comprises processing circuitry configured to:

define a portion of an output feature map to be generated in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map; and for each tile, provide information which allows each data element position forming the tile to be mapped to a respective memory location for storing data for the data element associated with the position;

and the processor is further configured to, when performing neural network processing to generate a portion of an output feature map:

when storing into memory data for a data element position within the portion of the output feature map, identify which tile of the one or more defined tiles the position falls within, identify a memory location at which to store data for the position using the provided information which allows each position forming the tile to be mapped to a respective memory location, and store the data at the identified memory location.

As will be appreciated by those skilled in the art, the embodiments of the technology described herein can, and in an embodiment do, include any one or more or all of the features of the technology described herein, described herein.

For example, the tile(s) of the output feature map portion are in an embodiment defined in the manners discussed above in relation to the tiles for an input feature map portion. Correspondingly, the information to allow the mapping of data positions within tiles of an output feature map to a memory location for storing the data for the data positions is in an embodiment of the forms discussed above in relation to the input feature map portion, and the processor in an embodiment determines the memory location at which to store data for a data element position in an output feature map portion using the information mapping output feature map tile positions to memory locations in the manner discussed above for the reading of input feature map portions.

(In general, any of the above features described in relation to the handling and processing of input feature map portions can be, and are in an embodiment, used and applied correspondingly in the case of the handling of output feature map portions (and the storing of (data elements of) an output feature map portion to memory).

The neural network processing which generates the portion of the output feature map may comprise a layer of neural network processing. This layer of neural network processing may be "cascaded" with a subsequent (next) layer of neural network processing, as discussed above, such that both layers of neural network processing are performed on the basis of portions. Accordingly, the portion of the output feature map which is generated and written to memory may be used (at least in part) for a portion of an input feature map for a subsequent layer of neural network processing.

Correspondingly, once the above steps have been performed for writing a first portion of an output feature map to memory, they may be performed again when writing a next portion of the output feature map to memory, and so on, until the entire output feature map has been generated.

As noted above, the neural network processing of the technology described herein may comprise performing a first and a next (second) layer of neural network processing on the basis of portions (such that the first and second layers are "cascaded"). Thus, the neural network processing may comprise generating and storing portions of an output feature map by a first layer of processing in the manner of the technology described herein, and then reading at least some of the data which has been written to memory by the next (second) layer of processing as portions of an input feature map for said next (second) layer of processing in the manner of the technology described herein (and so on, for further layers of processing).

When "cascading" a first and second (next) layer of neural network processing, the first and second layers of neural network processing may be performed successively such that the second layer of neural network processing reads data from memory for a portion of an input feature map which has been written to memory when generating a portion of an output feature map by a first (previous) layer of neural network processing. For example, the second layer may begin reading a portion of an input feature map from memory as the first (previous) layer is generating and writing to the memory a portion of an output feature map (which is to be used as a portion of an input feature map by the second layer). Alternatively, the second layer may begin reading a portion of an input feature map from memory (only) once the first (previous) layer has completed generating and writing to the memory a portion of an output feature map (which is to be used as a portion of an input feature map by the second layer).

The portions of the input and output feature maps can be stored in any suitable and desired memory of and/or accessible to the neural network processor. In an embodiment they are stored in a "local", working memory for the processor. In an embodiment, a portion of memory (a buffer) is allocated for storing the feature map portions, which buffer is in an embodiment a "cascade" buffer, to be used for storing portions of an output feature map generated by a first layer of neural network processing, which are then to be used as portions of an input feature map for a subsequent layer of neural network processing.

The "cascade" buffer in an embodiment has a size which is smaller than the output feature map which is to be generated by the first layer of neural network processing (and thus smaller than the input feature map which is to be processed by the subsequent layer of neural network processing), such that the cascade buffer is not large enough to store an entire input (or output) feature map. In an embodiment the cascade buffer has a size that is able to store an entire (input or output) feature map portion. In an embodiment, the cascade buffer has a size that is able to store an entire (input or output) feature map portion, and at least part of another (input or output) feature map portion (e.g. corresponding to a filter margin)

The "cascade" buffer is in an embodiment configured and operated as a rolling buffer which rolls in both the horizontal (x) direction and the vertical (y) direction. Thus, when writing data to the "cascade" buffer, when a horizontal or vertical edge of the buffer is reached, then the next data position to which data will be written rolls to the opposite horizontal or vertical edge respectively, in an embodiment with a horizontal offset when rolling vertically, or a vertical offset when rolling horizontally.

The neural network processing in the manner of the technology described herein may be controlled and triggered in any suitable and desired manner. This is in an embodiment done using an appropriate set of commands (instructions) and other data included in a command stream that is provided to, and executed by, the processor, to control and trigger the operations in the manner of the technology described herein. Hence, the processor which is to perform the neural network processing executes a command stream in order to perform neural network processing.

The command stream may be provided by any suitable and desired element or processor, etc. It is in an embodiment provided and generated by a driver for the neural network processor, e.g. executing on a host processor (such as a Central Processing unit (CPU) of the overall data processing system). The set of instructions forming the command stream may be stored in a memory which is accessible to the processor which is to perform the neural network processing.

The command stream in an embodiment comprises appropriate commands (instructions) which, when executed by the neural network processor, cause (trigger) the neural network processor to perform the desired neural network processing (including reading portions of an input feature map from memory for processing and/or writing portions of an output feature map to memory, and processing portions of an input feature map to generate corresponding portions of an output feature map). The commands (instructions) of the command stream may comprise commands (instructions) which set various parameters (such as those described above) to be used when performing neural network processing by the neural network processor. The parameters set by commands (instructions) in the command stream may include, for example, parameters to define one or more tiles for a portion of a feature map and/or parameters to provide information which allows positions within the portion of the feature map to be mapped to respective locations in memory.

In an embodiment, the parameters which are set by commands (instructions) in the command stream include: one or more parameters from which the dimensions (height and/or width) of each defined tile can be derived, and one or more parameters which indicate a base memory address corresponding to a base (reference) position of each defined tile.

As noted above, the processor may be configured to determine a relative position of a data element within a tile from information indicating the dimensions of the tiles, and then to determine a location in memory (relative to the base memory address of the tile) from which to read data for the data element by scaling the relative position by any appropriate strides.

Thus, other information (e.g. parameters) which may be used by the processor includes the various strides discussed above. The information regarding strides is in an embodiment set by means of suitable instructions in the command stream, although other arrangements would be possible if desired. As noted above, the information regarding strides is, in embodiments, common to (the same for) all defined tiles for a particular portion of a feature map (but the information regarding strides may differ for different feature maps and/or feature map portions). Hence, the information regarding strides may be set by means of suitable instructions for a (each) portion of a (each) feature map which is to be processed.

The processor that performs the neural network processing may be an accelerator or processor specifically configured for (or dedicated to) performing neural network processing (a Neural Network Accelerator/Processor (NNA)). Alternatively the processor could comprise any processor suitable for performing neural network processing such as, for example, a microcontroller unit (MCU), a central processing unit (CPU), a graphics processing unit (GPU) (graphics processor), a video processor, a sound processor, an image signal processor (ISP), or a digital signal processor The data processing system may be implemented as part of any suitable electronic device which may be required to perform neural network processing, e.g., such as a desktop computer, a portable electronic device (e.g. a tablet or mobile phone), or other electronic device. Thus the technology described herein also extends to an electronic device that includes the data processing system of the technology described herein (and on which the data processing system operates in the manner of the technology described herein). The data processing system of the present may, in an embodiment, be implemented as part of a portable electronic device (such as a mobile phone, tablet, or other portable device).

The data processing system may comprise any desired components and elements that a data processing system can comprise, such as one or more or all of: a display processing unit (display processor), a central processing unit (CPU), a graphics processing unit (GPU) (graphics processor), a video processor, a digital signal processor, one or more neural network processors, and a display.

The processors may be arranged within a system-on-chip system.

The data processing system may comprise and/or be in communication with one or more memories (such as the memories described above) that store the data described herein, and/or store software for performing the processes described herein. As discussed above, the data processing system may be in communication with a host microprocessor, and/or with a display for displaying output data associated with the neural network processing.

The memory may comprise one or more local memories, which may be located on-chip. The local memory may comprise one or more buffers (for example, such as a "cascade" buffer).

The memory may also comprise a main memory, which may be an external memory which may be located off-chip. The main (external) memory may be any suitable type of memory, such as SDRAM for example.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuitries may share processing circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

Figure 2:
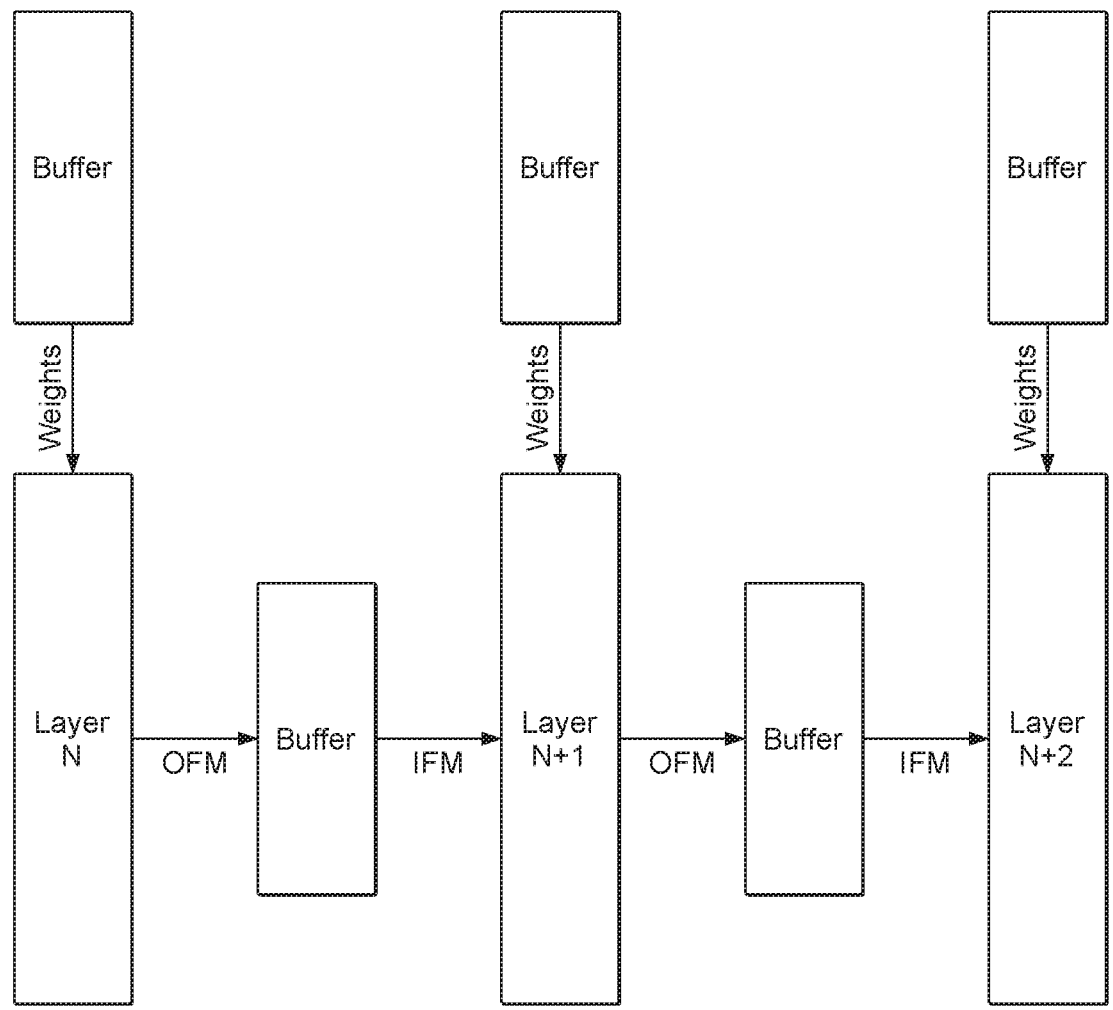
FIG. 2 illustrates a sequence of layers of neural network processing, wherein the output feature map from a layer of neural network processing may be written to a suitable buffer and then use as an input feature map for a next layer in the sequence, and wherein each layer of neural network processing may use processing parameters (e.g. such as weights) which are read from a suitable buffer.

Neural network processing generally comprises plural layers of processing, wherein each layer performs an operation on an input feature map in order to generate an output feature map, as shown in FIGS. 1 and 2, for example, and as described above.

Each layer of neural network processing may process an entire input feature map, and correspondingly generate and write out an entire output feature map for use as an input feature map for a next layer. However, this would require a large amount of working memory to be set aside for storing the entire feature map between the layers of processing (especially since it may be necessary to provision for changes in the size of the data array depending on the processing performed by a particular layer).

Figure 3:
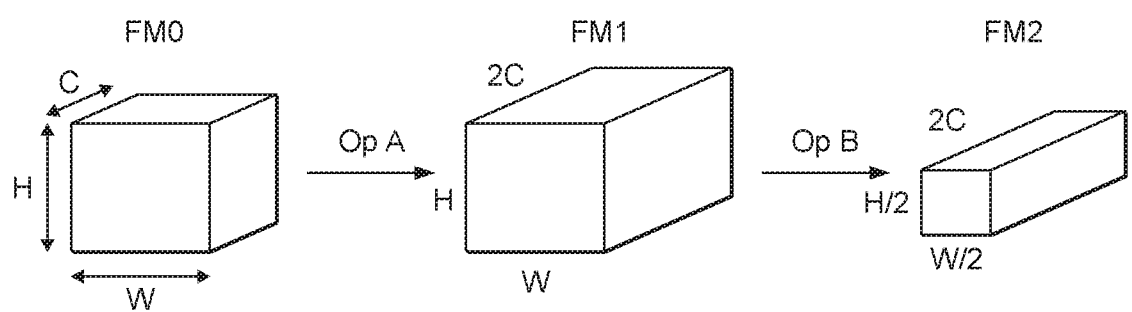
FIG. 3 illustrates how the size of a feature map may vary when processed according to various layers of neural network processing.

For example, FIG. 3 shows how the size of a feature map may change as a result of various layers of neural network processing. In particular, in FIG. 3, a feature map FM0 having an initial size H×W×C, is processed according to a layer performing an operation A to generate an output feature map FM1 having a size of H×W×2C, which is then used as an input feature map for a next layer of processing which performs an operation B to generate a corresponding output feature map FM2 having a size H/2×W/2×2C. The Applicants have recognised that, in such situations, it may be desirable to avoid storing at least the feature map occurring between the successive operations A and B and having a size H×W×2C in its entirety.

Accordingly the Applicants have recognised that it may be desirable to process a feature map as a plurality of portions which are smaller than the entire feature map. In particular, a first operation (layer) may perform processing for a respective input feature map on a portion-by-portion basis, by successively processing portions of the input feature map, e.g. until the entire input feature map has been processed. When processing a portion of the input feature map, the first operation (layer) may generate and write to a suitable buffer a corresponding portion of an output feature map. A successive operation (layer) may then perform processing using, at least in part, the portion of the output feature map which has been written to the buffer. In this manner, the successive operation (layer) also processes the feature map on a portion-by-portion basis, as the portion(s) of the output feature map from the first operation (layer) are written to the buffer, and are therefore available for processing according to said successive operation (layer). In this manner, it is not necessary to store the entire feature map between the first and second operations, and so it may be possible to provision a smaller amount of memory than that which would be required to store the entire feature map between the first and second operations.

Such an arrangement wherein portions of feature maps are processed by successive operations may be particularly useful for situations such as shown in FIG. 3 where a first operation (operation A) increases the size of a feature map (to W×H×2C) compared to the input feature map received for processing by the operation A (which had a size of W×H×C). Hence, processing on the basis of portions may be particularly useful in situations where a feature map which is present between two successive operations (layers) is larger than a feature map prior to (and/or after) the successive operations (layers).

As discussed above, a feature map may comprise an array of data elements, each data element having a position within the feature map (which may be defined as an x and y position within the feature map), and each data element having data associated therewith. A portion of a feature map similarly comprises an array of data elements (wherein the portion of the feature map has an array of data elements which is smaller than, i.e. is a sub-set, of the array of data elements which form the entire feature map). Accordingly, a portion of the feature map comprises an array of data elements, each data element having a position within the portion of the feature map (which may be defined as an x and y position within the portion of the feature map), each data element having data associated therewith.

Figure 4:
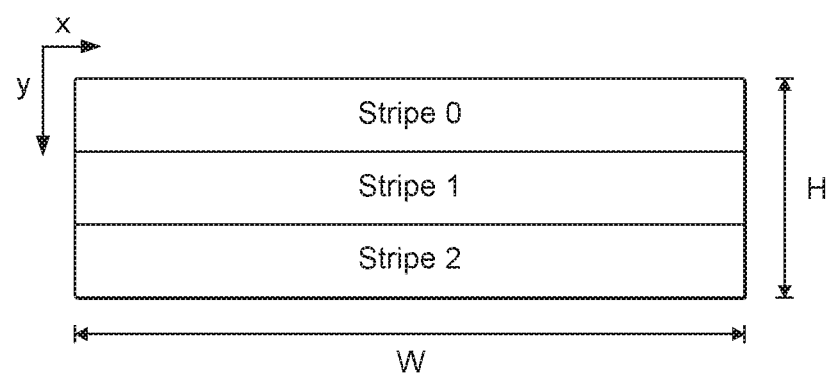
FIG. 4 is an exemplary division of a feature map into portions ("stripes") in which each portion extends across the full width of the feature map.

FIG. 4 shows one possible division of a feature map into portions. The feature map may be an input feature map to which a layer of neural network processing is to be applied, or an output feature map generated as a result of a layer of neural network processing.

In the example of FIG. 4, the feature map is divided into portions comprising "Stripe 0", "Stripe 1" and "Stripe 2". In this example, each portion is rectangular, and has a width and a height corresponding to a number of data elements in the width direction (x direction) and height direction (y direction) of the feature map. In the example shown in FIG. 4, each portion has a width equal to the width W of the feature map, and has a height less than the height H of the feature map. However, since the portions shown in FIG. 4 comprise "stripes" which extend across the full width of the feature map then a relatively large amount of memory may still be required to store such portion(s) of the feature map.

Figure 5:
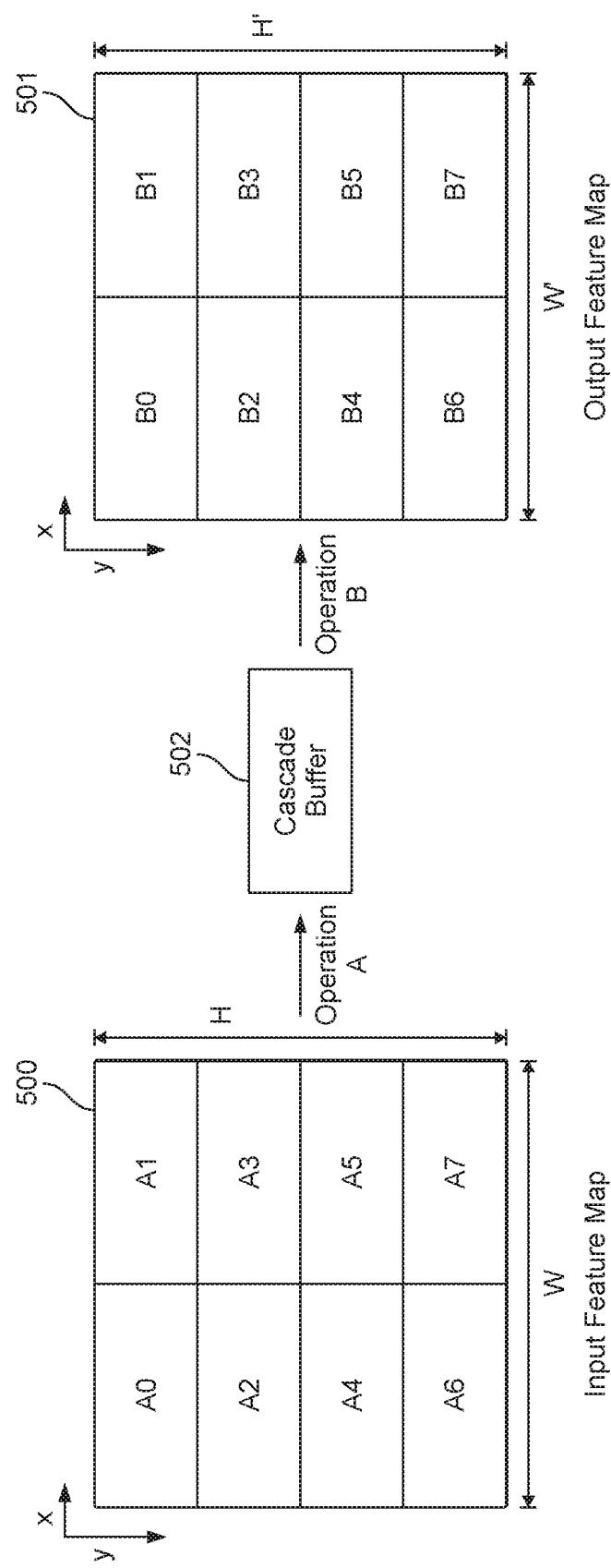
FIG. 5 illustrates processing of feature maps according to first and second successive operations (layers) in an embodiment of the technology described herein, wherein each operation (layer) processes portions of a feature map which are less than the full width of that feature map.

FIG. 5 shows an alternative subdivision of feature maps into portions ("stripes"). In particular, an input feature map 500 for a first operation (operation A) is divided into portions A0 to A7, each of which is rectangular and has a width and a height which are smaller than the width W and the height H of the input feature map 500. In the example shown in FIG. 5, each of the portions A0 to A7 has the same height and the same width. Alternatively, the heights and widths of the portions could differ from one another if desired. In the example shown in FIG. 5 the feature map 500 is apportioned into two columns of portions, wherein each column comprises multiple rows of portions. Alternatively, the feature map could be apportioned into more than two columns if desired.

Operation A will process each of the portions A0, A1, A2, A3, A4, A5, A6 and A7 in turn, to generate a corresponding portion of an output feature map which is stored to a buffer 502 (also referred to herein as the "cascade buffer"). In the example shown in FIG. 5 the portions are arranged such that the processing is performed row-by-row, with portions A0 and A1 forming the first row, portions A2 and A3 forming the next row, and so on.

Apportioning a feature map as shown in FIG. 5 can allow a relatively smaller amount of working memory to be set aside in the buffer 502 for storing the portions of the output feature map which are generated when performing operation A (compared to using whole-width stripes such as shown in FIG. 4).

A next layer of the neural network processing comprising a second operation (operation B) may use the output feature map from operation A as its input feature map. Operation B may be "cascaded" with the first operation (operation A) in the sense that operation B performs processing using the portions of the output feature map generated by operation A (rather than waiting until an entire output feature map has been generated by operation A). Operation B may read portions of its input feature map from the cascade buffer, and generate corresponding portions B0-B7 of an output feature map 501. As shown in FIG. 5, the portions B0-B7 may each be rectangular and have a width and a height which are smaller than the width W' and the height H' of the output feature map 501. In the example shown in FIG. 5, each of the portions B0-B7 has the same height and the same width. Alternatively, the heights and widths of the portions could differ from one another if desired. In the example shown in FIG. 5 the feature map 501 is apportioned into two columns of portions, wherein each column comprises multiple rows of portions. Alternatively, the feature map could be apportioned into more than two columns if desired.

In the example shown in FIG. 5, the number of portions processed by operation B is the same as the number of portions processed by operation A (i.e. the same number of rows and columns of portions). However, the size of the portions B0-B7 may differ from the size of the portions A0-A7, depending for example, on whether operation A or B causes a change in the size of the feature map.

Furthermore, each portion read from the buffer 502 for processing by operation B is not necessarily exactly the same as a portion previously output by operation A. For example, if operations A and B comprise filter operations (which are commonly used in neural network processing), then the portions written by operation A and the portions read by operation B may differ as a result of accounting for filter margins.

Figures 14, 15:
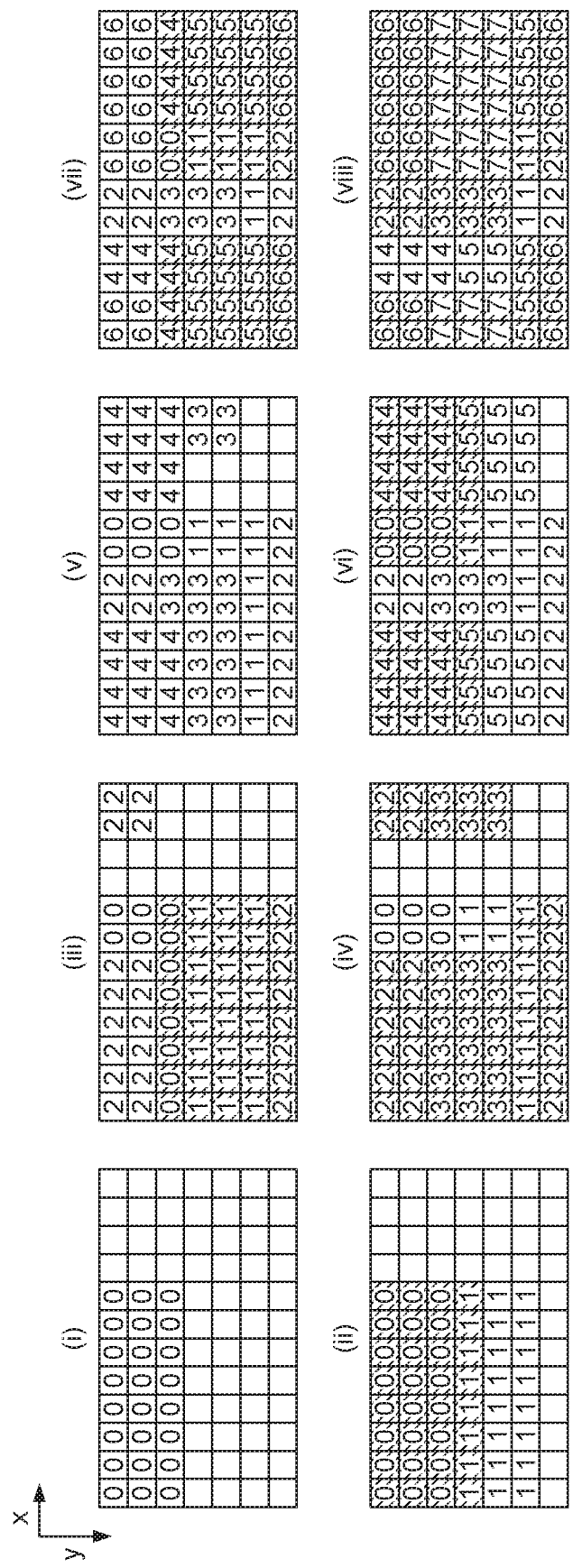
FIG. 14 shows an alternative division of a feature map into portions, compared to FIG. 5.

Alternatively, a feature map to be processed by a first operation A could be apportioned as shown in FIG. 14, wherein the portions A0 to A7 form two columns of portions. In this case, the portions are arranged such that processing is performed column-by-column, with portions A0 to A3 forming the first column, and portions A4 to A7 forming the second column. Any later "cascaded" operations, which similarly perform processing on the basis of portions, will generate an output feature map comprising the same arrangement of two columns of portions.

Figure 6:
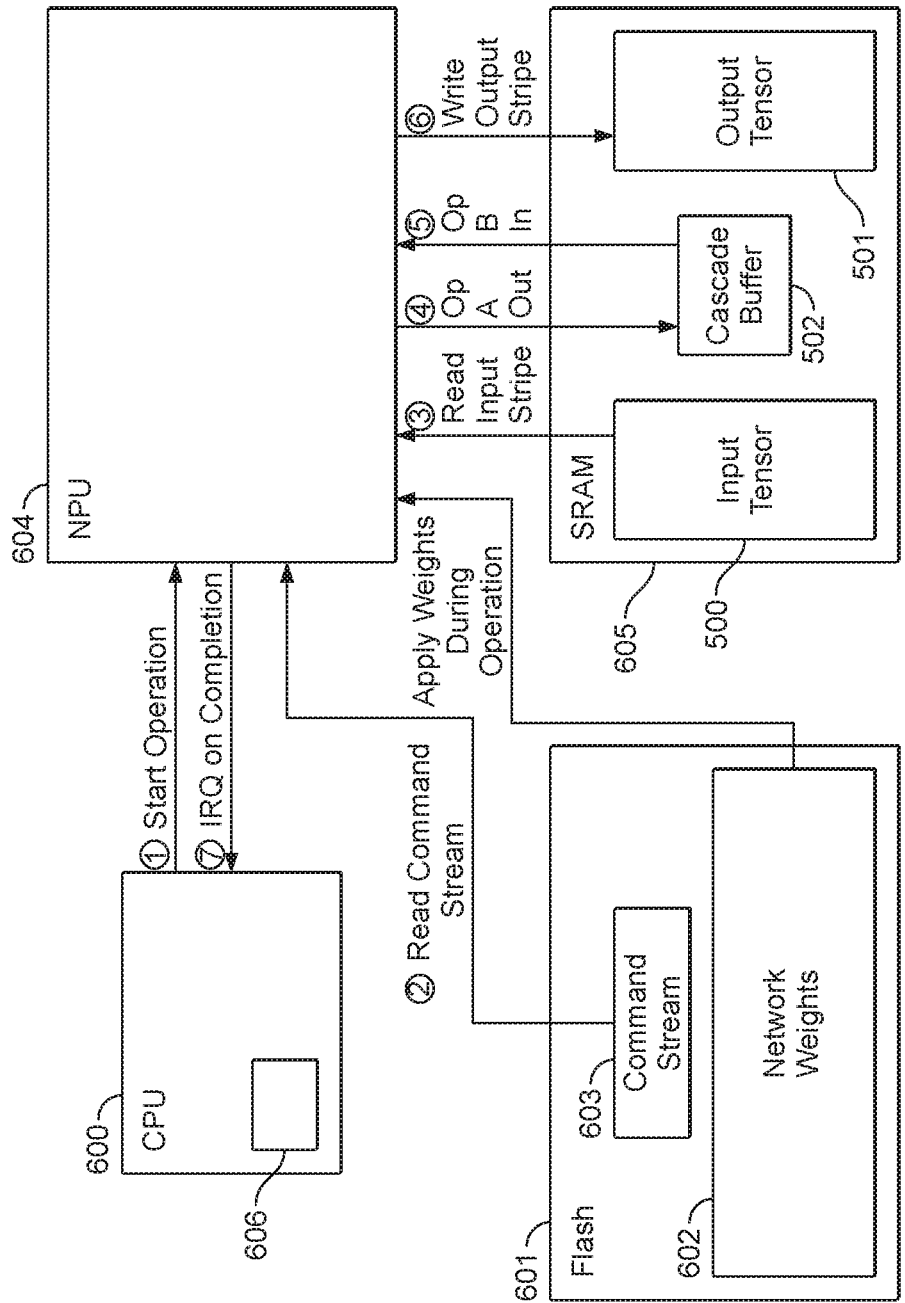
FIG. 6 is a system diagram showing data flows for processing feature maps in accordance with FIG. 5.

FIG. 6 is a system diagram showing an embodiment of a data processing system, and the data flows, for processing a feature map, e.g. in accordance with FIG. 5, wherein operations A and B are "cascaded". The system comprises a CPU 600, and a neural network processing unit (NPU) 604. The NPU 604 may comprise a processor specifically configured for performing neural network processing (e.g. for performing operations for layers of neural network processing). Alternatively, the NPU 604 may comprise any other suitable processor which is able to perform neural network processing, such as the CPU itself or a graphics processing unit (GPU).

The system of FIG. 6 also comprises a memory 601 for storing a command stream 603. The command stream comprises a sequence of instructions for controlling the operation of the NPU 604 and which will be generated by the CPU 600 (e.g. by a driver 606 for the NPU 604, the driver 606 executing on the CPU 600). The memory 601 also stores processing parameters 602 for the neural network processing. The processing parameters 602 may comprise, for example, weights for the operations which are to be performed by the NPU 604 (e.g. weights for filter operations). The memory 601 in FIG. 6 is shown to be a flash memory, however, other types of memory could be used if desired, e.g. such as dynamic random access memory (DRAM).

The system of FIG. 6 also comprises "working" memory 605 for storing the feature maps (or portions thereof) associated with the neural network processing. The "working" memory 605 is shown as static random access memory (SRAM), however, other suitable types of memory could be used if desired. For example, memory 601 and working memory 605 could be parts of the same physical memory if desired. One or more parts of the working memory 605 may be provided for storing entire feature maps (such as feature maps 500 and 501). A buffer 502 (referred to herein as a "cascade buffer") is stored in the working memory for storing portions of feature maps between successive "cascaded" operations. The buffer 502 should be stored in memory which allows relatively fast access, e.g. such as SRAM. The buffer 502 may not be large enough to store an entire feature map.

When performing "cascaded" operations A and B, the data flow will generally commence with the NPU 604 receiving an instruction or other command from the CPU to begin neural network processing (step 1 in FIG. 6). The NPU

604 will then access (e.g. read from memory) the command stream 603 relevant for performing the neural network processing (step 2).

In FIG. 6, the neural network processing to be performed comprises operations A and B, which form successive layers of processing. In accordance with the instructions in the command stream 603, the NPU 604 reads a portion ("stripe") of an input feature map 500 (step 3), processes the portion according to operation A and writes a corresponding portion of an output feature map to the buffer 502 (step 4).

When performing operation B, the NPU 604 reads a portion of an input feature map for operation B from the buffer 502 (step 5) wherein the portion which is read comprises data which has previously been output to the buffer 502 as a result of performing operation A (step 5). The NPU 604, processes said portion of the input feature map according to operation B, and then writes a corresponding portion of an output feature map 501 to the working memory 605 (step 6).

Portions of the feature maps may be processed according to operations A and B in this manner, until the entire feature input feature map 500 for operation A has been processed (and correspondingly the entire output feature map 501 from operation B has been generated).

In the embodiment shown in FIG. 6, only operations A and B are "cascaded". Prior to operation A, the entire input feature map 500 is stored in the working memory 605, and after operation B the entire output feature map 501 is stored in the working memory 605. In comparison, the buffer 502 need not store an entire output feature map generated by operation A (corresponding to an entire input feature map for operation B).

It will be appreciated that the "cascading" described above need not be limited only to two operations A and B, corresponding to two layers of neural network processing. Indeed, plural (e.g. two or more) successive operations (layers) may be "cascaded" such that each of the operations (layers) processes feature maps on a portion-by-portion basis. In such an arrangement, plural buffers ("cascade buffers") may be provided, wherein each cascade buffer stores portion(s) of feature maps between successive operations (layers). In this case, feature maps may only be stored in their entirety before the first operation of the plural successive operations, and after the last operation of the plural successive operations.

Figure 11A:
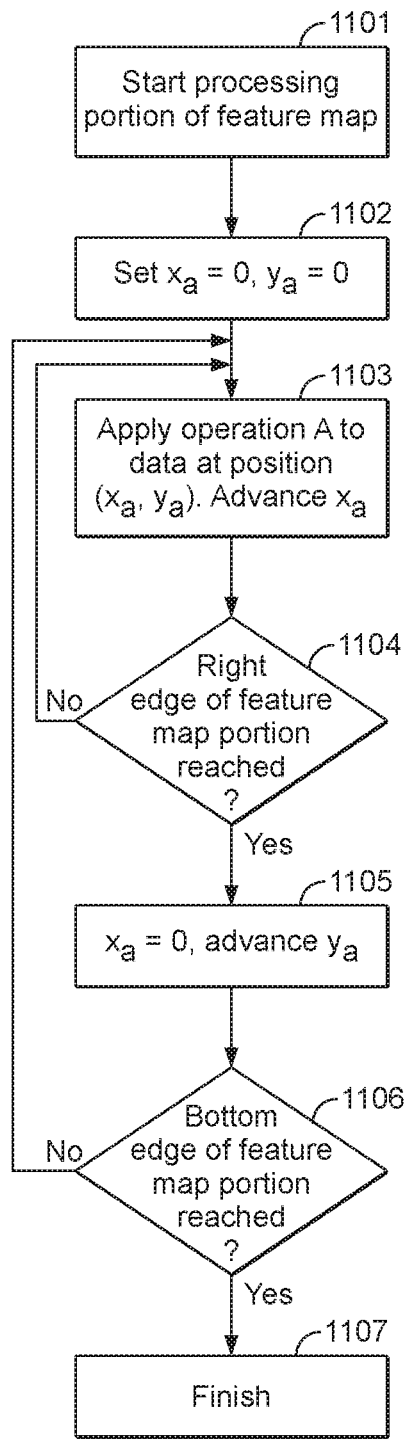
FIGS. 11A and 11B are flowcharts showing processing of a portion of a feature map according to each of operations A and B respectively.
Figure 11B:
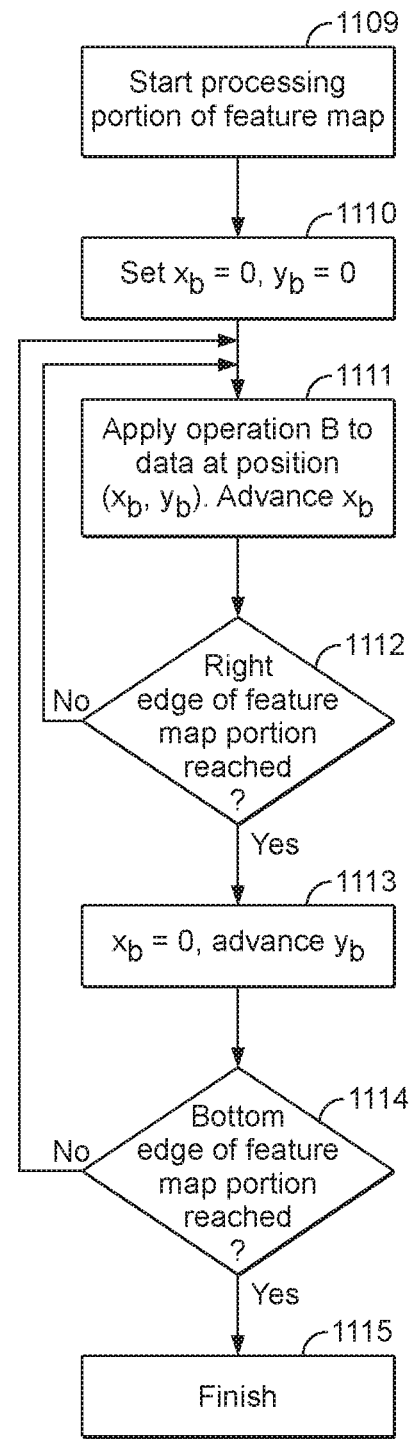

FIG. 11A is a flowchart showing the processing of a portion of a input feature map according to operation A. FIG. 11B is a flowchart showing the processing of a portion of a input feature map according to operation B which may be "cascaded" with operation A as described with respect to FIGS. 5 and 6.

As can be seen from FIG. 11A, once processing of a portion of an input feature map commences (step 1101), a first position to be processed by operation A is identified by setting the x and y positions within the portion of the input feature map to zero (step 1102). Thus, in this example, the first position to be processed is the upper-left-most position within the portion of the feature map. The data for the data element corresponding to the identified position is then processed according to operation A (step 1103) so as to generate data for a corresponding position in a portion of an output feature map, wherein the generated data is then written to the cascade buffer.

As can be seen from steps 1103 to 1106, the position which is identified (and for which processing is performed) is progressively incremented until the entire portion of the input feature map has been processed. In this example, the processing is performed from left to right, and row-by-row. In particular, the identified position is incremented along a row (in the x direction) until the edge of the portion of the input feature map is reached, and then the next row is selected (by setting x=0 and incrementing the y position). This is continued until bottom edge of the portion of the input feature map is reached.

The processing according to FIG. 11A may be repeated for each portion of an input feature map until the entire input feature map has been processed according to operation A.

Operation B may process a portion of a respective input feature map as set out in FIG. 11B. As shown, once processing of the portion of the input feature map commences (step 1109), positions may be identified sequentially within the portion of the input feature map and may be processed according to steps 1110 to 1114, in a manner analogous to that described with respect to FIG. 11A. However, a difference exists in that, at step 1111, applying operation B will comprise reading data for the data element corresponding to the identified position from the cascade buffer and performing operation B to generate data for a corresponding position in an output feature map which may be written to any suitable memory.

The processing according to FIG. 11B may be repeated for each portion of an input feature map until the entire input feature map has been processed according to operation B.

As noted above, for "cascaded" operations A and B, the portion of the input feature map used when performing operation B comprises at least some of the data that has been written to the cascade buffer when generating portions of an output feature map according to operation A.

The processing of a portion of an input feature map by operation B may be performed by the NPU 604 after operation A has finished processing a portion of an input feature map (to generate a portion of an output feature map for use by operation B). In such embodiments, the NPU 604 thus performs processing of a portion according to the flowchart of FIG. 11B once the processing for a portion according to the flowchart of FIG. 11A has completed.

Figure 11C:
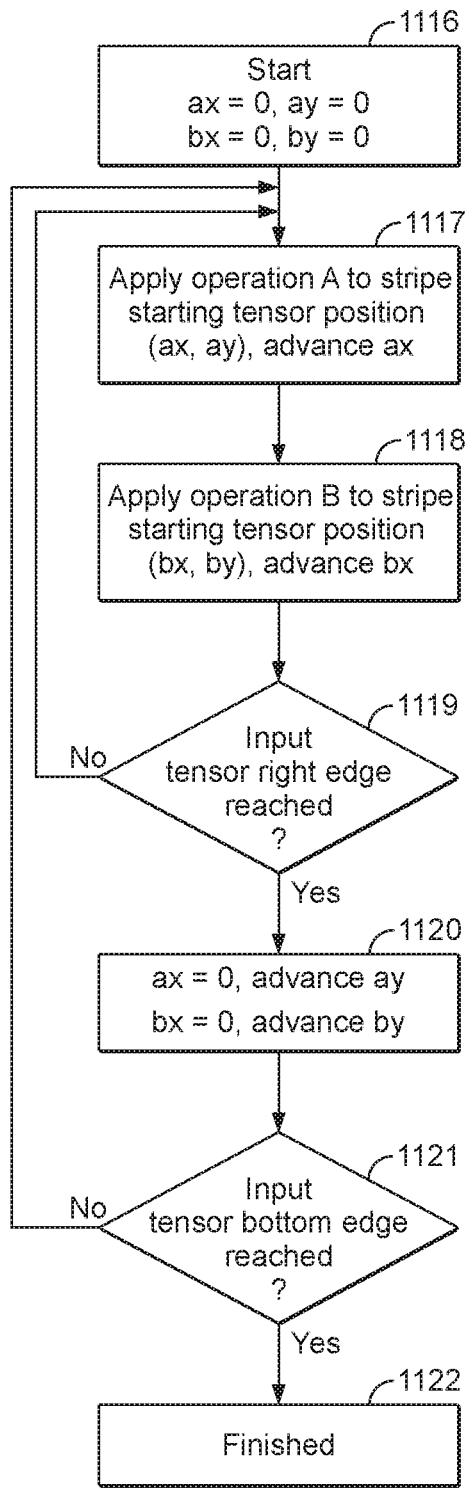
FIG. 11C is a flowchart showing processing of a portion according to both operations A and B according to an embodiment of the technology described herein.

Alternatively, the NPU 604 need not wait until operation A has finished processing a portion of an input feature map before commencing processing according to operation B. For example, a flow chart as shown in FIG. 11C could be used, in which processing according to operation A and B is performed in parallel, such that operation B performs processing for each position in its respective input feature map once operation A has completed processing the same position in its respective input feature map.

A potential difficulty with processing feature maps on a portion-by-portion basis is how to handle processing of various portions which are to be written to memory (or which are to be read from memory).

For example as discussed above, when "cascading" successive operations A and B, it may be desirable to provide a relatively small cascade buffer 502 which is not large enough to store an entire output feature map generated by operation A (which forms the input feature map for operation B). In this situation, portions of an output feature map generated by operation A which are written to the cascade buffer later in time in the neural network processing may need to overwrite portions which have previously been written to the cascade buffer. If operation A or B comprises a filter operation, however, then the portions of the output feature map generated by operation A may need to be written to the cascade buffer in a manner that preserves any filter margins which may be required when performing processing according to operation B. For example, in order to retain a filter margin, newly generated output feature map portions may need to be written to the cascade buffer so as to avoid overwriting at least last of a previous output feature map portion that has been written to the cascade buffer. If a cascade buffer of only a relatively small size is provided, it may be desirable, therefore, to manage the cascade buffer such that data for said newly generated output feature map portion is 'fitted around' at least some of the data for the previous portion. The Applicants have recognised that in such situations, it may be possible to efficiently write data for output feature map portions to the cascade buffer (and read data for input feature map portions from the cascade buffer) by using one or more tiles, with each tile being mapped to a respective set of memory locations. Examples scenarios for the use of such tiles will be discussed in more detail below.

Hence, according to the technology described herein, when performing neural network processing on the basis of portions, a portion of an output feature map which is to be written to memory (or a portion of an input feature map which is to be read from memory) is described in terms of one or more tiles. Each tile corresponds to (includes) a region of the portion of the feature map comprising one or more contiguous positions of data elements forming the portion of the feature map.

Information is also provided which allows the data positions forming (within) each tile to be mapped to respective memory locations, thereby allowing data corresponding to each position to be written to (or read from) memory (the cascade buffer).

Figure 7:
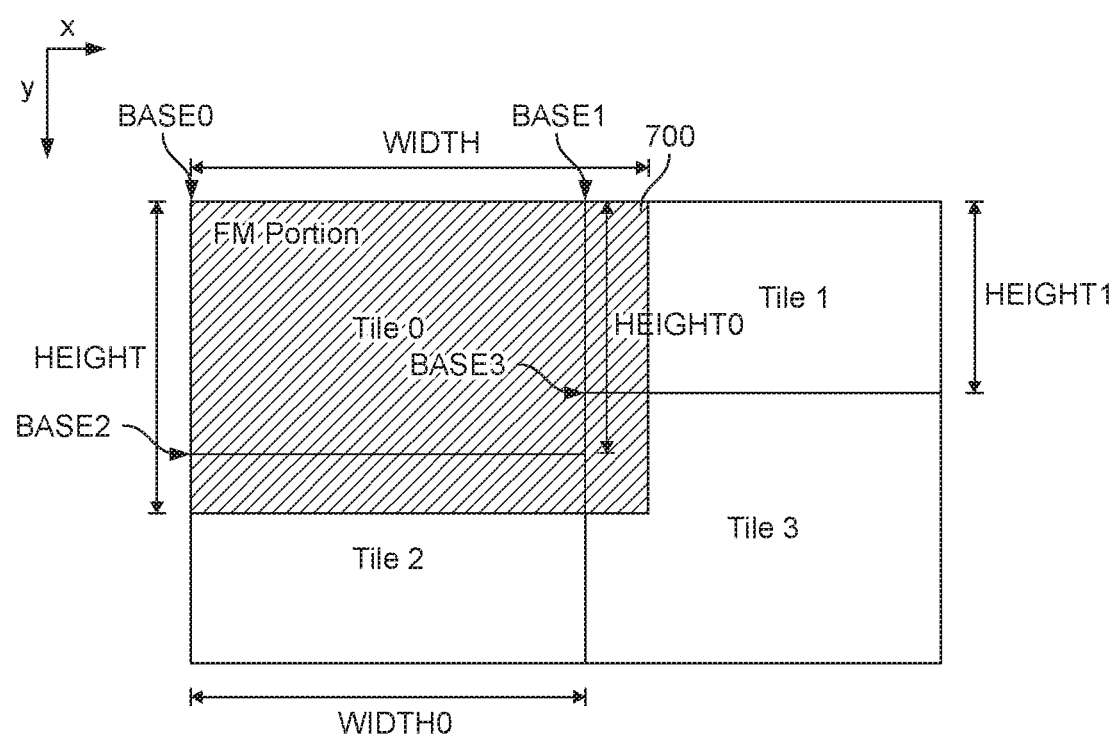
FIG. 7 illustrates how plural tiles may be used to describe a portion of a feature map.

FIG. 7 shows a possible definition of a portion of a feature map 700 in terms of one or more tiles. In the example shown in FIG. 7, four tiles are available to be defined Tile 0, Tile 1, Tile 2 and Tile 3, wherein each tile may be used to describe a region of the portion of the feature map comprising contiguous positions of data elements in the array of data elements which form the portion of the feature map. In the example shown in FIG. 7, each tile is rectangular. Each tile has a width and a height corresponding to a number of positions of data elements in the width or height direction respectively.

In the example shown in FIG. 7, the tiles comprise two columns of tiles, wherein tiles within the same column have a same width. In this case, Tile 0 and Tile 2 have the same width (which is WIDTH0), and similarly Tile 1 and Tile 3 have the same width as each other. The tiles in different columns may, however, have different widths. The height of the tiles within a column may differ. Tiles in different columns may also have different heights. For example, in the example shown in FIG. 7, each of the tiles Tile 0, Tile 1, Tile 2 and Tile 3 has a different height.

Each tile has a base position (origin) (see FIG. 7, BASE0, BASE1, BASE2, BASE3), which corresponds to the origin of an x,y coordinate system for the tile. In the example shown in FIG. 7, each base position corresponds to the top left corner of a tile.

Figure 16:
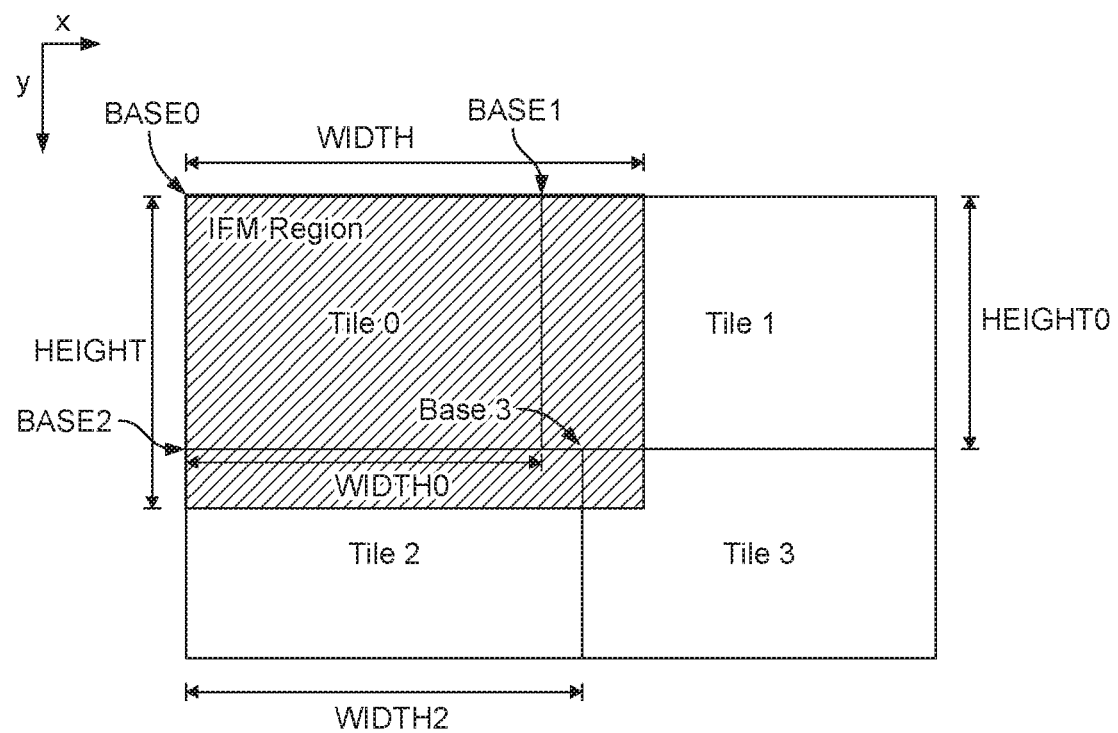
FIG. 16 illustrates an alternative tiled arrangement, compared to FIG. 7, which may be used to describe portions of a feature map, and which may be suitable when a buffer is managed in the manner illustrated in FIGS. 15(i) to (iii).

An alternative manner of defining tiles is shown in FIG. 16. In this case there are four tiles, Tile 0, Tile 1, Tile 2 and Tile 3. The tiles form rows, wherein tiles in the same row have the same height. In the example shown Tile 0 and Tile 1 have the same height (which is HEIGHT0), and similarly Tile 2 and Tile 3 have the same height as each other. The width of the tiles within a row may differ. Tiles in different rows may also have different widths. In the example shown in FIG. 16, none of the tiles Tile 0, Tile 1, Tile 2 and Tile 3 have the same width. In FIG. 16, each tile has a base position BASE0, BASE1, BASE2, BASE3 similarly to FIG. 7.

During neural network processing, in the present embodiments, information is provided to define a portion of a feature map in terms of one or more tiles. Information is also provided to allow each position within each tile that is used to be mapped to a memory location of the cascade buffer 502. The information is provided by means of descriptors within the command stream 603.

The information provided for defining each of the tiles comprises information which allows the height and the width of each tile to be determined. (As shown in FIGS. 7 and 16, the arrangement of tiles relative to one another is known or predetermined).

It would be possible to set a parameter value for the height and width of each tile to be used. However, as in the present embodiments the width and height of the tiles have a predetermined relationship relative to one another, it is not necessary to do so. For instance, as in the example shown in FIG. 7, tiles in the same column have the same width, all four tiles may be defined using a (only) a width WIDTH0 for Tile 0, a height HEIGHT0 for Tile 0, a height HEIGHT1 for Tile 1, a height HEIGHT for the portion of the feature map, and a width WIDTH for the feature map.

In the example shown in FIG. 7, the width of Tile 2 is the same as the width WIDTH0 of Tile 0, since they are in the same column. The width of Tiles 1 and 3 can be inferred from the difference between the width WIDTH of the portion of the feature map and the WIDTH0 of Tile 0. The height of Tile 2 can be inferred from the difference between the height HEIGHT of the portion of the feature map and the height HEIGHT0 of Tile 0. The height of Tile 3 can be inferred from the difference between the height HEIGHT of the portion of the feature map and the height HEIGHT1 of Tile 1.

In the example shown in FIG. 16, due to the tiles being arranged in rows, the tiles are defined using (only) a height HEIGHT0 of Tile 0, a WIDTH0 of Tile 0, width WIDTH2 of Tile 2, a width WIDTH of the portion of the feature map, and a height HEIGHT of the portion of the feature map. The width of Tile 1 can be inferred from the difference between WIDTH and WIDTH0, whilst the height of Tile 1 is equal to HEIGHT0. The height of Tile 2 and Tile 3 can be inferred from the difference between HEIGHT and HEIGHT0. The width of Tile 3 can be inferred from the difference between WIDTH and WIDTH2.

FIG. 8 provides a list of descriptors (parameters) that are available for use in the command stream in the present embodiments to indicate a portion of an input feature map to be read from memory. In particular, the descriptors of FIG. 8 provide variables for defining tiles according to the arrangement of FIG. 7.

As noted above, due to the predetermined relationship between the height and width of the tiles, it is not necessary to explicitly provide the height and width of every tile. Thus, consistent with the discussion with regards to FIG. 7, in FIG. 8 a parameter is provided for the height of the portion of the input feature map IFM_HEIGHT, and for the width of the portion of the input feature map IFM_WIDTH (wherein the preceding "IFM . . . " merely identifies the parameters as being specific to an input feature map). A parameter is also provided for the depth of the of the portion input feature map IFM_DEPTH (which is a number of channels of the feature map). A parameter is also provided for the width of Tile 0 which is IFM_WIDTH0, the height of Tile 0 which is IFM_HEIGHT0, and the height of Tile 1 which is IFM_HEIGHT_1. As discussed with regards to FIG. 7, the tile heights and widths which are not explicitly described by a parameter may be inferred from these listed parameters.

Each of the above parameters corresponding to a width, height or depth indicate a size in the width direction (x direction), height direction (y direction) and depth direction (z direction), respectively of a tile, in terms of a number of positions of data elements in that direction.

Further parameters are provided to allow the position of each of the data elements within a tile to be mapped to a corresponding memory location (from which data for the data element is to be read).

Hence, as shown in FIG. 8, parameters IFM_BASE0, IFM_BASE1, IFM_BASE2, and IFM_BASE 3 are provided, which can be used to map the base position (in this case the upper left corner) of each tile (BASE0, BASE1, BASE2, BASE3 respectively) to a respective memory location in the cascade buffer 502.

Parameters are also provided to indicate a stride between data elements in the cascade buffer. The stride may be used to convert the position of a data element within a tile relative to the base position of the tile into an offset (spacing) in memory relative to the memory address to which the base position of the tile is mapped.

The stride in a particular direction corresponds to the distance (in this case the number of memory locations) in memory between the start of adjacent data element positions in the direction in question. As shown in FIG. 8, parameters IFM_STRIDE_X and IFM_STRIDE_Y are provided to indicate a stride in the x and y directions respectively. IFM_STRIDE_C indicates a "block stride", and is used in situations where the input feature map comprises plural channels which are grouped into "blocks" that are stored within different regions of memory, such that the "block stride" indicates a memory address spacing between said blocks. IFM_STRIDE_N indicates a "batch stride" which may be used when performing batched processing of plural input feature maps, wherein IFM_STRIDE_N indicates a memory address spacing between the feature maps of a batch of feature maps which are being processed.

The above parameters may be used to read data for data elements forming a portion of an input feature map from corresponding positions in memory on the basis of the defined tiles. In particular, the position in memory from which to read data for a data element is determined in the present embodiments as set out below:

int read_input<type>(n,y,x,c) {
t=0;
if (x>WIDTH0) {x-=WIDTH0; t+=1;}
if (y>=HEIGHT[t] {y-=HEIGHT(t); t+=2;}

$a=\text{BASE}[t]+n*\text{STRIDE\_}N+y*\text{STRIDE\_}Y+$
$x*\text{STRIDE\_}X+(c/\text{BRICK})*\text{STRIDE\_}C+(c\%$
$\text{BRICK})*\text{ElemSize};$ Return *(<type>*)a;

This determination takes the position of a data element within the portion of the feature map which is to be read from memory (defined by variables n, x, y and c, where x represents a position of the data element of interest in the x direction of the portion of the input feature map, y represents a position in the y direction of the portion of the input feature map, c represents the channel to be read for the data position, and n represents the batch (i.e. the particular input feature map) in which the data position is located).

It is then determined which of the tiles the position of the data element of interest falls within, and the relative location of the position of the data element within that tile.

In the above example a variable t is provide which represents a tile under consideration. Initially, variable t is set such that t=0, i.e. identifying the uppermost tile in the left-most column, Tile 0, as a tile which is potentially of interest. Then it is determined whether x>WIDTH0, and if so then variable t is incremented by 1. In other words, it is identified whether the data position of interest is located outside of the first (leftmost) column which has width WIDTH0 in the x direction, and if so the second column (adjacent in the x direction) is identified as the column of interest by specifying the tile under consideration as the uppermost tile in the next column, Tile 1.

If it is determined that x>WIDTH0, i.e. that the data position of interest is located outside of the first column, then the value of x is adjusted accordingly so that x describes the relative location of the data position of interest within the second column. This is done by setting x-=WIDTH0.

Next it is determined whether y>=HEIGHT[t], and if so the variable t is incremented by 2. In other words, it is identified whether the data position of interest is located outside of the uppermost tile in the relevant column (which has height HEIGHT[t], wherein t is 0 or 1 depending on the previous determination) and if so the a lower tile is identified in the column of interest, which is tile 2 or 3.

If it is determined that y>=HEIGHT[t], i.e. that the data position of interest is located outside of the uppermost tile in the relevant column, then the value of y is adjusted accordingly so that y describes the relative position of the data of interest in relevant tile. This is done by setting y-=HEIGHT[t].

Once the relevant tile has been determined, and the relative position of the data element within that tile has been identified, the memory location (address) from which to read the data for that data element is then determined as follows:

$a=\text{BASE}[t]+n*\text{STRIDE\_}N+y*\text{STRIDE\_}Y+$
$x*\text{STRIDE\_}X+(c/\text{BRICK})*\text{STRIDE\_}C+(c\%$
$\text{BRICK})*\text{ElemSize};$ In other words, the memory location is determined by taking the indicated memory (address) location (BASE[t]) of the base position (the upper left corner) of the tile in question, and then adding to that an offset which accounts for the batch in question (calculated by n*STRIDE_N), the relative position of the data element within the tile (calculated by y*STRIDE_Y+x*STRIDE_X), the block of channels within which the data element in question falls (calculated by (c/BRICK)*STRIDE_C), and the channel within the block of channels (calculated by (c % BRICK)*ElemSize). The data is then read from the resulting identified memory location using the expression "Return *(<type>*) a".

The data which is read from the identified memory location may then be processed according to a corresponding neural network layer (operation).

Data may be read from memory and processed for each data element within the portion of the input feature map in this manner, for example by incrementing the x,y position in the manner discussed with respect to FIGS. 11A and 11B.

FIG. 9 shows how a portion of an output feature map may be defined (specified) in the command stream. Descriptors (parameters) are available for defining the tiles in a manner analogous to that described with respect to FIG. 8, wherein the preceding "OFM . . . " merely identifies those parameters as being specific to an output feature map.

In particular, a parameter is provided for the height of the portion of the output feature map OFM_HEIGHT, the width of the portion of the output feature map OFM_WIDTH, and the depth of the of the portion output feature map IFM_DEPTH (which is a number of channels of the feature map). A parameter is also provided for the width of Tile 0 which is OFM_WIDTH0, the height of Tile 0 which is OFM_HEIGHT0, and the height of Tile 1 which is OFM_HEIGHT1.

A parameter is also provided for the memory location (address) of the base position of each tile, OFM_BASE0, OFM_BASE1, OFM_BASE2, and OFM_BASE 3.

Parameters OFM_STRIDE_X and OFM_STRIDE_Y are provided for indicating a stride in the cascade buffer between the data for data elements which have adjacent positions in the x and y directions respectively of the portion of the output feature map. OFM_STRIDE_C indicates a "block" stride, and is used in situations where the output feature map comprises plural channels which are grouped into "blocks" that are to be stored within different regions of memory, such that the "block stride" indicates a memory address spacing between said blocks. OFM_STRIDE_N is a "batch stride" indicative of a memory address spacing between the data for successive output feature maps when performing batched processing of feature maps. The above parameters are used to determine a memory location to which to write a data element of a portion of an output feature map generated when performing neural network processing in the present embodiments, as follows:

Void write_output<type>(n,y,x,c,value) {
t=0;
if (x>WIDTH0) {x-=WIDTH0; t+=1;}
if (y>=HEIGHT[t] {y-=HEIGHT(t); t+=2;}

$a$=BASE[$t$]+$n$*STRIDE_$N$+$y$*STRIDE_$Y$+
$x$*STRIDE_$X$+($c$/BRICK)*STRIDE_$C$+($c$%
BRICK)*ElemSize;

*(<type>*)a=value;

This determination first selects a position of a data element within the portion of the feature map which is to be written to memory (defined by variables n, x, y, c and value, where x represents a position of the data element of interest in the x direction of the portion of the output feature map, y represents a position in the y direction of the portion of the output feature map, c represents the channel in which the data position is located and n represents the batch (i.e. the particular output feature map) in which the data position is located). The variable 'value' corresponds to the value of the generated data, which is to be written to memory It is then determined which of the tiles the position of the data element of interest falls within, and the relative location of the position of the data element within that tile.

In the above example, this is done by providing a variable t which represents a tile under consideration. Similarly to the above discussion with respect to input feature maps, the variable t modified such that it represents the tile in which the data elements is located, and the variables x and y are also modified so as to provide the relative position of the data element within that tile.

The memory location to which data for the data element is to be written is then determined. In this example, an integer 'a' represents the memory location to which data is to be written, and is calculated as follows:

$a$=BASE[$t$]+$n$*STRIDE_$N$+$Y$*STRIDE_$Y$+
$x$*STRIDE_$X$+($c$/BRICK)*STRIDE_$C$+($c$%
BRICK)*ElemSize;

In other words, the memory location is determined by taking the memory location (address) (BASE[t]) of the base position of the tile in question, and then adding to that the an offset which accounts for the batch in question (calculated by n*STRIDE_N), the relative position of the data element within the tile (calculated by y*STRIDE_Y+ x*STRIDE_X), the block of channels within which the data element in question falls (calculated by (c/BRICK)*STRIDE_C), and the channel within the block of channels (calculated by (c % BRICK)*ElemSize). The data is then written to the identified memory location using the expression "*(<type>*)a=value". When other tiled arrangements such as shown in FIG. 16 are used, similar principles to those discussed above may apply when determining a location in memory from which to read data when processing a portion of an input feature map (or determining a location in memory to which to write data for a portion of an output feature map). For instance, the processing may similarly comprise, for a position of interest in the portion of the feature map, identifying in which tile the position of interest is located, determining the relative position of the position of interest within that tile, and then reading data from (or writing data to) a corresponding location in memory, the location in memory having an offset relative to a base address in memory for that tile, wherein the offset is determined based on the relative position of the position of interest in the tile and any appropriate strides in memory.

Figure 10:
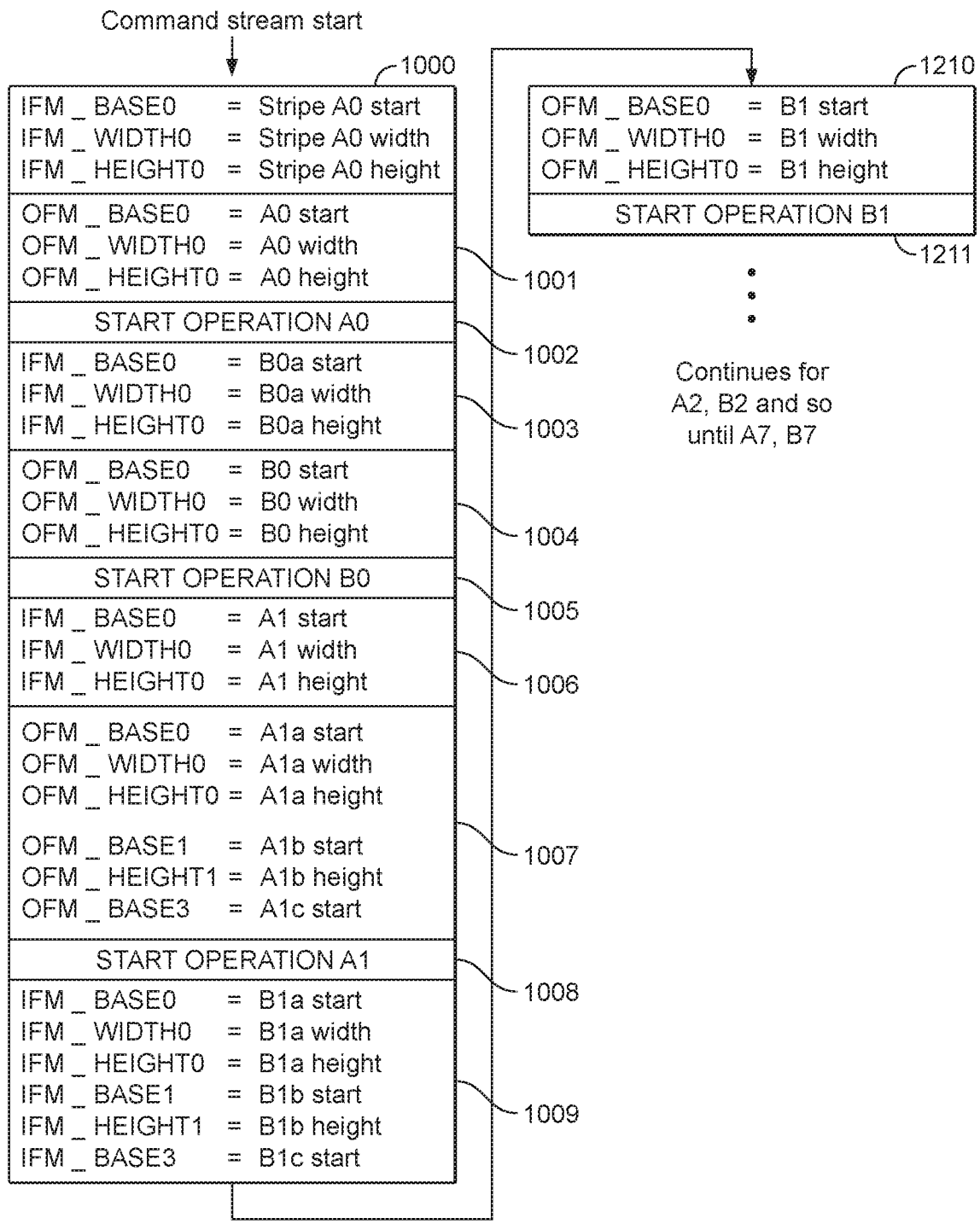
FIG. 10 is an exemplary series of instructions that may be provided in a command stream for processing portions of feature maps by consecutive layers of neural network processing performing operations A and B respectively in an embodiment of the technology described herein.

FIG. 10 shows an example part of a command stream utilising the descriptors from FIGS. 8 and 9 which is used to control the processing by the NPU 604 of portions of a feature map according to cascaded operations A and B. In particular, the part of the command stream shown in FIG. 10 comprises instructions for processing portions A0 and A1 of a feature map by cascaded operations A and B to generate portions B0 and B1 of an output feature map, similarly to that shown in FIG. 5.

The instructions 1000 of FIG. 10 comprise instructions which set various parameters to define a tile for use when reading a portion A0 of the input feature map from memory for processing according to operation A. The instructions 1001 comprise instructions to set various parameters to define a tile for use when writing a portion A0a of an output feature map generated by operation A to the cascade buffer. The next instruction 1002 is an instruction to perform the processing to operation A. Instruction 1002, when executed, will cause the NPU to read portion A0 of the input feature map from memory, process portion A0 to generate a portion A0a of an output feature map, and write the portion A0a to the cascade buffer. The reading of data from memory and the writing of data to the cascade buffer will make use of the defined tiles as discussed above.

The next instructions in the command stream 1003 comprise instructions to set various parameters to define a tile for use when reading a portion B0a of an input feature map from the cascade buffer for processing according to operation B. The instructions 1004 comprise instructions to set various parameters to define a tile for use when writing a portion B0 of an output feature map generated by operation B to memory. The next instruction 1005 is an instruction to perform the processing to operation B. Instruction 1005, when executed, will cause the NPU to read portion B0a of the input feature map from the cascade buffer, process portion B0a to generate a portion B0 of an output feature map, and write the portion B0 to memory. The reading of data from the cascade buffer and the writing of data to memory will make use of the defined tiles.

Instructions 1006, 1007 and 1008 comprise instructions for reading a next portion A1 of the input feature map from memory, processing portion A1 according to operation A to generate a portion A1a, and writing portion A1a to the cascade buffer. Similarly to instructions 1000, 1001 and 1002, instructions 1006, 1007 and 1008 comprise instructions for defining relevant tiles for reading portion A1 from memory and for writing portion A1a to the cascade buffer.

The next instructions in the command stream 1009, 1010 and 1011 comprise instructions for reading a portion B1*a* of an input feature map from the cascade buffer for processing according to operation B, processing portion B1*a* according to operation B to generate a portion B1, and writing portion B1 to the memory cascade buffer. Similarly to instructions 1003, 1004 and 1005, instructions 1009, 1010 and 1011 comprise instructions for defining relevant tiles for reading portion B1*a* from the cascade buffer and for writing portion B1 to the cascade buffer.

Further instructions may be provided in the cascade buffer for processing portion A2 by cascaded operations A and B to generate portion B2 of an output feature map, and so on for portions A3, B3, A4, B4 etc, until all of the portions of the input feature map have been processed by operation A (and accordingly all of the portions of the output feature map have been generated by operation B).

The parameters which are set and included in the command stream in order to define tiles for reading a portion of an input feature map from memory (or from the cascade buffer) may vary depending on the number and size of tiles which are to be used. This will, in turn depend on how the data for that portion is stored in memory (or in the cascade buffer). Similarly the parameters which are set in order to define tiles for writing a portion of an output feature map to memory (or to the cascade buffer) may vary depending on the number and size of tiles which are to be used, which in turn depends on how the data for that portion is to be stored in memory (or in the cascade buffer).

For instance, a relatively large amount of memory may be provisioned (allocated) for storing the input feature map 500 which is to be processed by operation A, such that input feature map 500 may be stored in its entirety in memory (as discussed with regards to FIG. 5). As a result, each of the portions A0 to A7 of input feature map 500 do not need to be sub-divided and distributed across plural different sets of memory locations in order to 'fit into' the allocated memory. Hence, only a single tile is needed to read from memory any of the portions A0 to A7 which form the input feature map 500. Accordingly instructions 1000 and 1006 of FIG. 10, only set values for a single tile (Tile0) having a base IFM_BASE0, a width IFM_WIDTH0 and a height IFM_HEIGHT0.

Similarly sufficient space in memory may be provisioned (allocated) for storing the output feature map 501 which is generated when performing processing according to operation B, such that output feature map 501 can be stored in its entirety in memory (as discussed with regards to FIG. 5). As a result, each of the portions B0 to B7 of output feature map 501 do not need to be sub-divided and distributed across plural different sets of memory locations in order to 'fit into' the allocated memory. Hence, only a single tile is needed to read from memory any of the portions B0 to B7 which form the output feature map 501. Accordingly instructions 1004 and 1110 of FIG. 10 only set values for a single tile (Tile0) having a base OFM_BASE0, a width OFM_WIDTH0 and a height OFM_HEIGHT0.

The portions which are to be written to (or read from) the cascade buffer may require a greater number of tiles depending on how the data is to be stored (or is stored) in the cascade buffer. As noted above, the ability to use plural tiles when writing data to (or reading data from) the cascade buffer for a portion of the feature map allows the cascade buffer to be managed in a relatively flexible manner, thus allowing data for portion of a feature map to be distributed across different sets of memory locations such that the data is 'fitted around' data for other portions of the feature map, for example to preserve filter margins even when a cascade buffer of only a relatively small size is provisioned (allocated).

For example, in instruction 1001 the parameters OFM_BASE0, OFM_WIDTH0 and OFM_HEIGHT0 are used to define a single tile (Tile 0) for use when writing portion A0*a* to the cascade buffer (because there is sufficient space in the cascade buffer to write portion A0*a* to a set of memory locations which can be described using a single tile). Similarly, instruction 1003 only sets the parameters IFM_BASE0, IFM_WIDTH0, and IFM_HEIGHT0 which are needed to define a single tile (Tile 0) for reading portion B0*a* from the cascade buffer. The other available parameters for defining Tile 1, Tile 2, and Tile 3 (of the available tiles shown in FIG. 7) may simply be omitted from the command stream.

For portions which are processed later on, it may be necessary to 'fit' the data for those portions around at least some of the data for previous portions in the cascade buffer. Therefore, it may be appropriate for such portions to define plural tiles for writing data to (or reading data from) the cascade buffer, wherein each tile can be mapped to a different set of memory locations containing data for the portion. This is shown, for example, in instruction 1007 wherein parameters OFM_BASED, OFM_WIDTH0, and OFM_HEIGHT0, OFM_BASE1, OFM_HEIGHT1, and OFM_BASE 3 are set in order to define three tiles, Tile 0, Tile 1 and Tile 3 for writing portion A1*a* to the cascade buffer. Similarly, instruction 1009 sets parameters IFM_BASE0, IFM_WIDTH0, IFM_HEIGHT0, IFM_BASE1, IFM_HEIGHT1, and IFM_BASE 3 in order to define Tile 0, Tile 1 and Tile 3 for reading portion B1*a* from the cascade buffer.

Various combinations of the available tiles (Tile 0, Tile 1, Tile 2 and Tile 3) may be defined as needed for use when writing a portion of an input feature map to the cascade buffer (or reading a portion of an output feature map from the cascade buffer).

Figure 12:
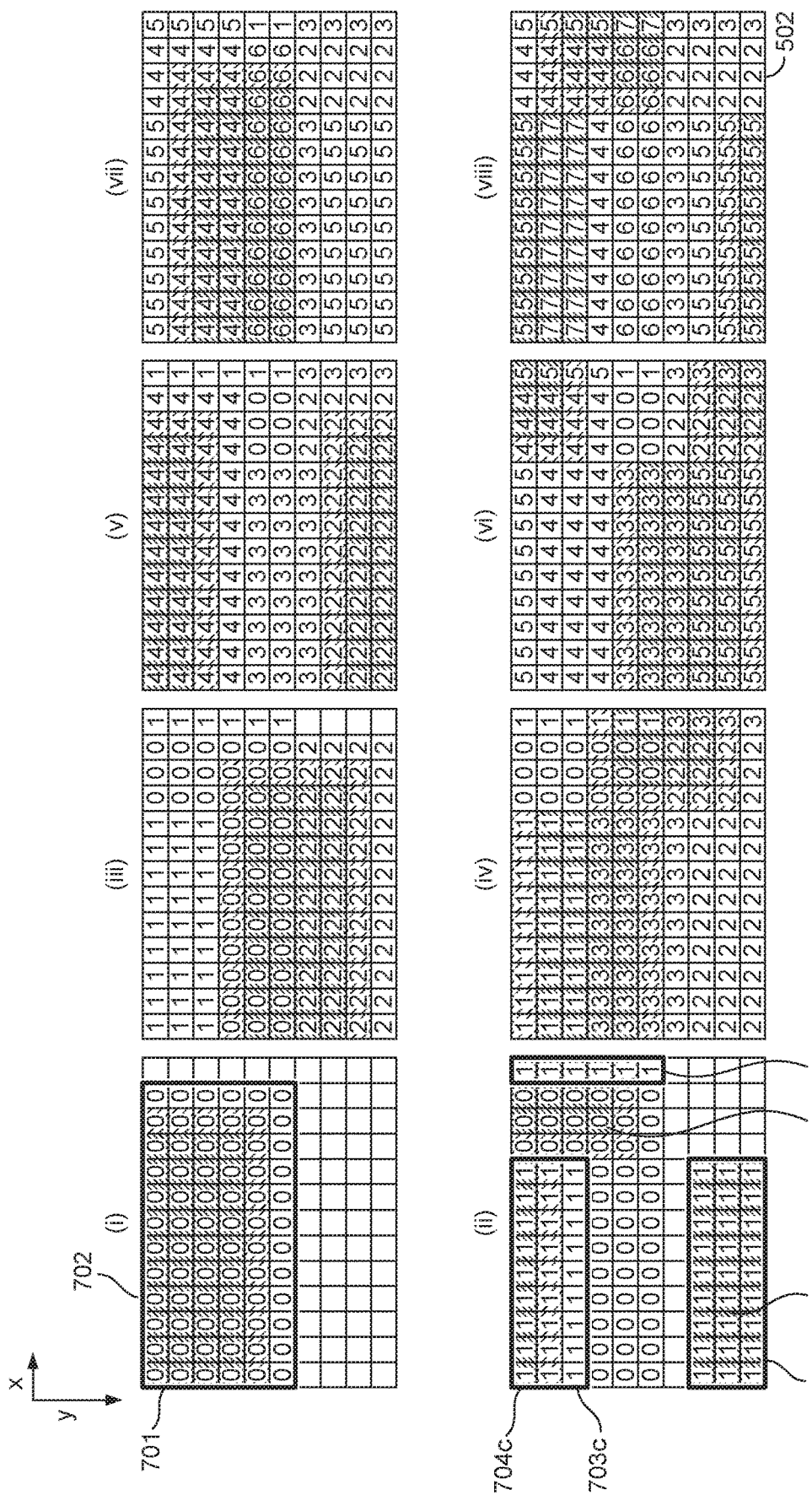
FIGS. 12(i) to (vii) provide examples of the content of a buffer to which portions of an output feature map are written when performing a first layer of neural network processing, and from which portions of an input feature map are read for performing a second (next) layer of neural network processing.

FIGS. 12(*i*) to (*vii*) show an example of the contents of a cascade buffer when performing neural network processing for successive "cascaded" operations A and B in the manner of the technology described herein.

The cascade buffer consists of memory locations which are allocated (set aside) for storing data for data elements of a feature map. As noted previously, the cascade buffer may consist of a relatively small number of allocated memory locations, such that a feature map cannot be stored in its entirety within those allocated memory locations.

The memory locations which form the cascade buffer may not be adjacent to one another. However, the memory locations which form the cascade buffer will be known or derivable.

For example, the cascade buffer may be logically considered as an array of positions having a known or predefined extent in a horizontal (x) direction and a vertical (y) direction, wherein each position corresponds (maps) to a memory location allocated for the cascade buffer, to which data for a data element can be written (or from which data for a data element can be read).

FIGS. 12(*i*) to (*vii*) show such a cascade buffer which can be considered as an array of x,y positions. In particular, the array shown is a 13×10 array of x,y positions. Each x,y position within the array may be identified by its x and y coordinate (spacing) relative to a base (reference) position of the array. In FIGS. 12(*i*) to (*vii*) the base (reference) position of the cascade buffer is the upper-left-most position of the array.

As noted above, each (x,y) position within the array corresponds (maps) to a memory location which is allocated for the cascade buffer. The mapping of x,y positions to respective memory locations may be any suitable mapping. For example, a memory location for each (x,y) position of the array may be identified (calculated) based on scaling the x coordinate of the position within the cascade buffer by a stride (memory address spacing) between adjacent positions in the x direction of the cascade buffer, and by and scaling the y coordinate of the position by a stride (memory address spacing) between adjacent positions in the y direction of the cascade buffer.

The array of x,y positions show in FIGS. 12(*i*) to (*vii*) may be mapped to a set of memory locations forming the cascade buffer which are suitable for storing data for a single channel of a feature map. When a feature map under consideration comprises plural channels (optionally grouped into "blocks" of channels), and/or when plural feature maps are being processed a batch of feature maps, then a set of memory locations of the cascade buffer may be provisioned for each channel of each feature map. The memory locations for different channels may be identified using an appropriate scaling to account for stride (memory address spacing) between channels (and optionally a stride (memory address spacing) between blocks of channels) and/or a stride (memory address spacing) between feature maps in the batch of feature maps.

Hence, it will be apparent that the mapping of each x,y position within the array which logically describes the cascade buffer to a memory location comprises scaling the x,y position in a manner similar to that discussed previously for mapping each x,y position within a defined tile to a memory location. Therefore, any region of contiguous x,y positions in the array which logically describes the cascade buffer will correspond to (map to) a set of memory locations having a known (or derivable) offset relative to one another. Hence, any region of contiguous x,y positions in the array which logically describes the cascade buffer may equally be described using a single tile defined in the manner of the technology described herein.

With regards to the contents of the cascade buffer, the example shown in FIGS. 12(*i*) to (*viii*) illustrates the contents of the cascade buffer when used to store portions of a feature map between cascaded operations A and B as shown in FIG. 5.

In particular, in FIGS. 12(*i*) to (*vii*), the numbers 0-7 at various positions of the array represent data element data which is written to corresponding memory locations of the cascade buffer when processing each of portions A0-A7 respectively of a feature map 500 according to operation A.

In FIGS. 12(*i*) to (*vii*), the dark shaded positions correspond to data element data which is read from corresponding memory locations of the cascade buffer in order to perform processing according to operation B, and the light shaded positions correspond to data element data which may be read if operation B needs to account for a filter margin.

In the example shown, processing of portion A0 (which is the first portion of the input feature map to be processed by operation A) generates a portion of an output feature map, the data for which is shown by the number 0 in FIG. 12(*i*). Since the cascade buffer was initially empty, the data can be written to a set of memory locations corresponding to (derivable from) a single set of contiguous x,y positions. Thus, a single tile can be used when writing the data to the cascade buffer.

Operation B then reads from memory and performs processing using a portion of an input feature map comprising at least some of the data which was output from operation A. The data is read from memory locations corresponding to the shaded x,y positions in FIG. 12(*i*)). In the case shown in FIG. 12(*i*), the memory locations from which data is read correspond to (are derivable from) a single set of contiguous x,y positions. Hence, a single tile can be used when reading that data from the cascade buffer.

When the next portion A1 (and similarly each of the later portions A2, A3 . . . etc.) of the input feature map is processed according to operation A to generate data for a corresponding portion of an output feature map, there may be limited space remaining in the cascade buffer, such that the newly generated data may need to overwrite some of the previously generated data. However, the newly generated data should be written to the cascade buffer in a manner that avoids overwriting any data which may still be required by operation B, e.g. data to be used as a filter margin when performing operation B.

For example, in the situation shown in FIG. 12(*ii*), the data of the output portion generated when processing portion A1 according to operation A is written such that data at the right and bottom borders of the output portion from processing portion A0 is not overwritten (is maintained) such that it may be used later as a filter margin for processing according to operation B. As a result, the data generated when processing portion A1 needs to be 'fitted around' the data from processing portion A0 which is maintained in the cascade buffer. Thus, the data from processing portion A1 is written to three sets of memory locations each corresponding to (derivable from) a set of contiguous x,y positions 703*a*, 703*b*, 703*c*. Thus, the data can be written to the cascade buffer by defining three tiles. The portion of the feature map which is then read for performing operation B (as shown by the shaded x,y positions in FIG. 12(*ii*)), similarly occupies three sets of memory locations each corresponding to (derivable from) a set of contiguous x,y positions 704*a*, 704*b*, 704*c*. Thus, this data can be read from the cascade buffer by defining three tiles.

The cascade buffer shown in FIGS. 12(*i*) to (*vii*) is a "rolling buffer", in the sense that data for a portion of the feature map is written to memory locations corresponding to contiguous x,y positions until a position at an edge of the x or y extent the array describing the cascade buffer is reached. Upon reaching an edge of the array describing the buffer, the x,y position will "roll" about that edge and data will continue to be written to memory locations corresponding to contiguous x,y positions starting from the opposite edge of the array describing the buffer. In the example shown in FIG. 7, the buffer "rolls" about all of its edges, such that it "rolls" in both the x (horizontal) and y (vertical) directions. In the example shown in FIG. 12, when "rolling" in the x (horizontal) direction, a y (vertical) offset is introduced. This can been seen, for example, from FIG. 12(*ii*) in which the data output as a result of processing portion A1 of the feature map is initially written to a memory location corresponding to an x,y position being the right-most column at the top of the array describing the buffer, but upon reaching the right-most edge, the rest of the data continues to be written to memory locations corresponding to x,y positions beginning from the left-most edge, with a positive vertical (y) offset of three positions (which also causes the data to roll vertically about the top edge). As illustrated in FIGS. 12 (*i*) to (*vii*) when such a rolling buffer is utilised, this may result in a portion of the feature map output from operation A being stored such that it occupies (is distributed across) plural sets of memory locations each corresponding to (mapping to) a contiguous set of x,y positions of the array describing the cascade buffer, such that each of those sets of memory locations can be described using a tile defined and mapped to memory in the manner of the technology described herein.

Similarly (and as a result of the output portions from A being distributed across plural sets of memory locations each corresponding to (derivable from) a contiguous set of x,y positions of the array describing the cascade buffer), a portion which is required to be read for performing processing according to operation B may be distributed across plural sets of memory locations each corresponding to (derivable from) a contiguous set of x,y positions of the array describing the cascade buffer.

Figure 13:
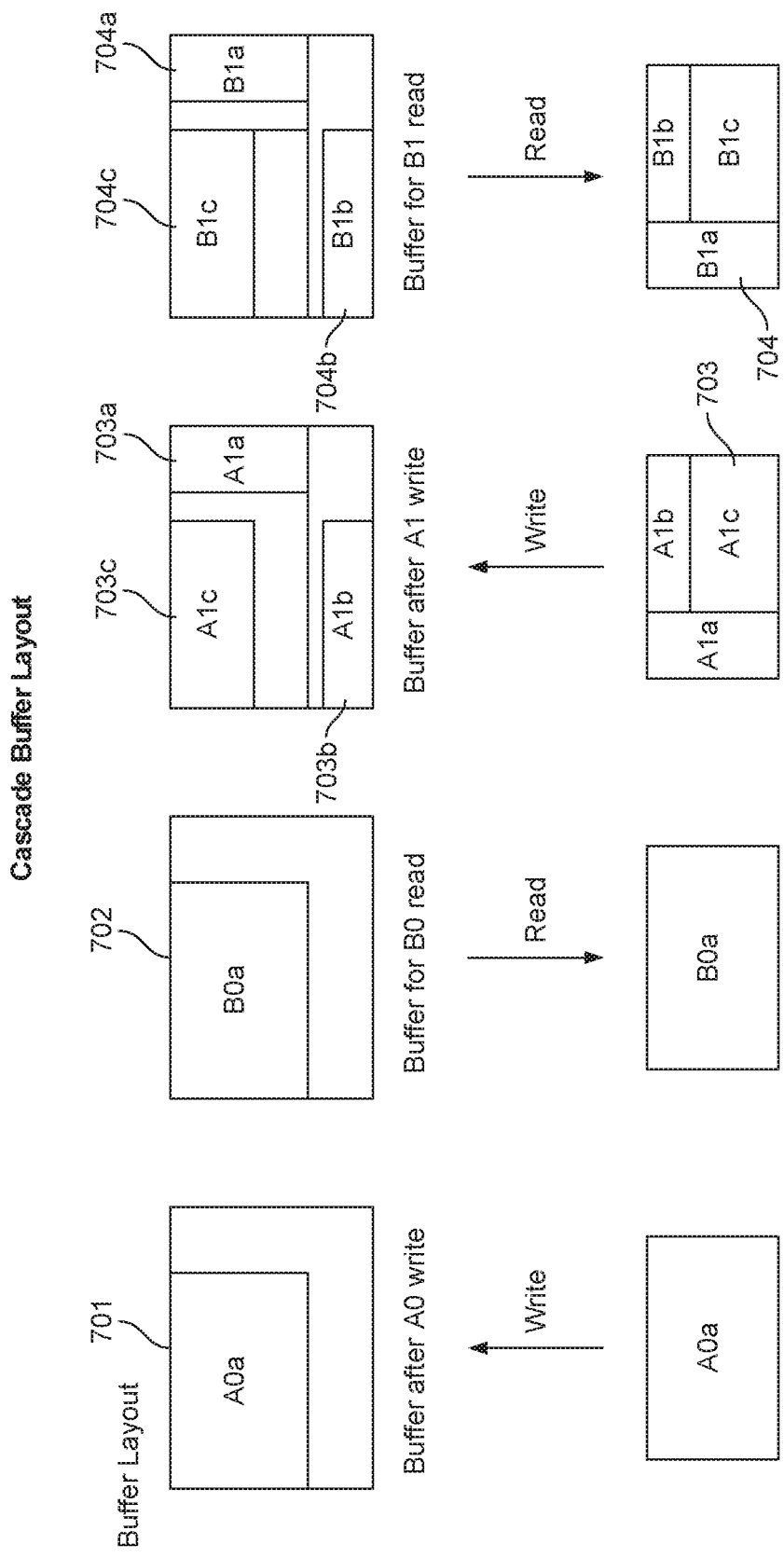
FIG. 13 illustrates, for situations corresponding to FIGS. 12(i) and (ii), how one or more tiles may be used to define a portion of an input feature map which is to be read from the buffer or to define a portion of an output feature map which is to be written to the buffer.

FIG. 13 is a simplified representation of the data which is written to and read from the cascade buffer in FIGS. 12(*i*) and (*ii*) which outlines each set of contiguous x,y positions within the array describing the cascade buffer, corresponding to memory locations to which data is written (or from which data is read), each of which may be described using a single tile in the manner of the technology described herein.

As shown in FIG. 13, when processing a first portion A0 of an input feature map according to operation A, the data for the corresponding portion of an output feature map is written to a set of memory locations corresponding to (derivable from) single set of contiguous x,y positions 701 of the cascade buffer, corresponding to a set of memory locations each having a known (and derivable) offset relative to one another, which can thus be described using a single tile A0*a* according to the technology described herein. When performing operation B, data corresponding to a portion of the input feature map for operation B is read from a set of memory locations corresponding to a single set of contiguous x,y positions 702, which can likewise be described using a single tile B0*a* according to the technology described herein.

FIG. 13 also shows the result of processing a next portion A1 of an input feature map according to operation A. The data for the corresponding portion of the output feature map 703 from processing portion A1 is written to three sets of memory locations of the cascade buffer each corresponding to a different set of contiguous x,y positions 703*a*, 703*b* and 703*c* (as discussed with respect to FIG. 12(*ii*)), such that said writing can be achieved using three tiles A1*a*, A2*a*, A3*a* in the manner of the technology described herein. When then performing operation B, the data 704 for the portion of the input feature map 704 to be processed by operation B is distributed across three sets of memory locations of the cascade buffer each corresponding to a different sets of contiguous x,y positions 704*a*, 704*b*, 704*c*, wherein said reading can likewise be achieved using three tiles B1*a*, B1*b*, B1*c* in the manner of the technology described herein.

Hence, one or more tiles may be defined for reading data from (or writing data to) memory depending on the manner in which data is stored (or is to be stored) in the cascade buffer. In fact, by way of example, the instructions set out in FIG. 10 define the relevant tiles (A0*a*, B0*a*, A1*a*, A1*b*, A1*c*, B1*a*, B1*b*, B1*c*) for reading and writing data to the cascade buffer in the scenario shown in FIG. 13

As can be seen from FIGS. 12(*i*) to (*vii*) when a cascade buffer is managed such that it rolls in the horizontal direction without a vertical offset, and rolls in the vertical direction with a horizontal offset, the memory locations at which data for a portion of a feature map are stored tend to correspond to one or more sets of contiguous x,y positions of the array describing the cascade buffer, each set of x,y positions having one of two possible widths in the x direction, whilst the height in the y direction of each set of x,y positions may vary. Accordingly the tile arrangement of FIG. 7 (having up to two columns, each column comprising one or more tiles, wherein tiles in the same column have the same width, and wherein the heights of the tiles may differ) may be appropriate for use when writing data for portions of an output feature map to (or reading data for portions of an input feature map from) memory locations of the cascade buffer.

Alternatively, if the feature maps are divided into two columns of portions, which are to be processed column-by-column as shown in FIG. 14, then the data may written to (and read from) a cascade buffer in a manner such as shown in FIGS. 15(*i*) to (*vii*). Again, the cascade buffer can be considered as an array of (x,y) positions, each corresponding (mapping) to a location in memory for the cascade buffer. In FIGS. 15(*i*) to (*vii*) the numbers 0-7 represent data element data which is written to the cascade buffer when a portion of an output feature map is generated as a result of processing portions A0-A7 respectively according to an operation A. The shaded positions correspond to data element data which is to be read when processing a portion of an input feature map by a next "cascaded" operation (such as operation B).

In the example shown in FIGS. 15 (*i*) to (*vii*) the cascade buffer is managed as a rolling buffer which rolls in the horizontal (x) direction without a vertical (y) offset, and which rolls in the vertical (y) direction with a negative horizontal (x) offset of two positions. This can be seen, for example, in FIG. 15 (*iii*) in which data for the portion of the output feature map generated as a result of processing portion A2 is initially written to memory locations corresponding to contiguous x,y positions beginning at the bottom row of the array describing the cascade buffer, such that the x,y positions then roll to the first row of the array describing the buffer with a negative horizontal offset of two positions.

When the cascade buffer is managed as shown in FIGS. 15(*i*) to (*vii*) data for a portion of a feature map tends to be stored in one or more sets of contiguous x,y positions (corresponding to one or more sets of memory locations), wherein each set of contiguous x,y positions has one of two different heights in the y direction, whilst the width in the x direction of each set may differ. Accordingly the tile arrangement of FIG. 16 (having up to two rows of tiles, each row comprising one or more tiles, wherein tiles within the same row have same height, and wherein the widths of the tiles may differ) may be appropriate for use when writing data for portions of an output feature map to (or reading data for portions of an input feature map from) the cascade buffer.

Although particular arrangements of tiles have been described with respect to FIGS. 7 and 16, other arrangements could be possible. For example, the particular tiled arrangement, e.g. the relationship between the heights and widths of the tiles, may be selected as appropriate depending on the data element data tends to be distributed across the memory when such data is written to (and thus read from) memory.

Thus it can be seen from the above that the technology described herein provides a mechanism for describing portions of feature maps in terms of one or more tiles, which may allow those portions to be written to or read from a (working) memory (e.g. cascade buffer) which has a relatively smaller size compared to the size of an entire feature map.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of controlling a processor operable to perform neural network processing in a data processing system comprising a processor operable to perform neural network processing and a memory for storing data to be used when performing neural network processing, the method comprising:

performing neural network processing for respective portions of an input feature map, each portion of the input feature map comprising an array of data elements, each data element having respective data associated therewith, each data element having an associated position within the input feature map, each portion of the input feature map each being smaller than the input feature map; and when performing neural network processing for a portion of an input feature map:

defining the portion of the input feature map in terms of one or more tiles, wherein each tile corresponds to a respective region of the portion of the input feature map, each region corresponding to one or more positions of data elements within the array of data elements of the portion of the input feature map, wherein the tiles together form the entirety of the portion of the input feature map;

for each tile, providing information which allows each data element position forming the tile to be mapped to a respective memory location storing data for the data element associated with the position;

the method further comprising:

the processor, when fetching from memory data for a data element position within the portion of the input feature map, identifying which tile of the one or more defined tiles the position falls within, identifying a memory location from which to read data for the position using the provided information which allows each position forming the tile to be mapped to a respective memory location, and reading the data from the identified memory location; and the processor processing the fetched data for one or more data elements in the input feature map portion so as to provide a data element or elements for a corresponding portion of an output feature map;

wherein the one or more tiles defined for the portion of the input feature map comprise:

one or more columns of tiles, wherein the processing system is configured to impose constraints upon the width of the one or more tiles such that when a column contains plural tiles, the plural tiles in the column have a same width relative to one another but can have a different height relative to one another, and wherein the processing system is configured to define the heights of tiles independently for each column such that when the one or more tiles form plural columns of tiles, tiles within different columns can have different heights relative to one another; or one or more rows of tiles, wherein the processing system is configured to impose constraints upon the height of the one or more tiles such that when a row contains plural tiles, the tiles within the row have the same height relative to one another but can have a different width relative to one another, and wherein the processing system is configured to define the widths of tiles independently for each row, such that then the one or more tiles form plural rows of tiles, tiles within different rows can have different widths relative to one another.

2. The method of claim 1, wherein the neural network processing for the portion of the input feature map comprises a layer of neural network processing, wherein the portion of the input feature map corresponds to at least part of a portion of an output feature map written to the memory when performing a previous layer of neural network processing.

3. The method of claim 1, wherein there is a predetermined maximum number of available tiles that may be defined.

4. The method of claim 1, wherein defining the portion of the feature map in terms of one or more tiles comprises setting a value of one or more parameters from which a height and a width of each of the tiles can be determined.

5. The method of claim 4, wherein the one or more parameters comprise an overall height of the portion of the feature map, an overall width of the portion of the feature map, and a height and/or width of at least one tile;

wherein when only one tile is to be defined, values are set for the parameters comprising the overall height of the portion of the feature map and the overall width of the portion of the feature map; and wherein when more than one tile is to be defined, values are set for the parameters comprising the overall height of the portion of the feature map, the overall width of the portion of the feature map, and the height and/or width of at least one tile.

6. The method of any claim 1, wherein the information which allows each position forming a tile to be mapped to a respective memory location storing data for the data element associated with the position comprises:

information which allows a base position for the tile to be mapped to a base memory location; and and information which allows a location in memory for data for a data element relative to the base memory location for the tile to be determined from a relative position of the data element within the tile.

7. The method of claim 6, wherein the information which allows a location in memory for the data for the data element relative to the base memory location for the tile to be determined comprises information indicative of at least one of: a stride in memory between adjacent data elements in a horizontal direction within the tile, a stride in memory between adjacent data elements in a vertical direction within the tile; a stride between memory locations storing data for different channels of a feature map; and a stride between memory locations storing data for different feature maps of a batch of feature maps.

8. A method of controlling a processor operable to perform neural network processing in a data processing system comprising a processor operable to perform neural network processing and a memory for storing data to be used when performing neural network processing, the method comprising:

performing neural network processing to generate respective portions of an output feature map, each portion of the output feature map comprising an array of data elements, each data element having respective data associated therewith, each data element having an associated position within the output feature map, each portion of the output feature map each being smaller than the output feature map; and when performing neural network processing to generate a portion of an output feature map:

defining the portion of the output feature map in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map;

for each tile, providing information which allows each data element position forming the tile to be mapped to a respective memory location for storing data for the data element associated with the position;

the method further comprising:

the processor, when storing in memory data for a data element position within the portion of the output feature map, identifying which tile of the one or more defined tiles the position falls within, identifying a memory location at which to store data for the position using the provided information which allows each position forming the tile to be mapped to a respective memory location, and storing the data at the identified memory location;

wherein the one or more tiles defined for the portion of the output feature map comprise:

one or more columns of tiles, wherein the processing system is configured to impose constraints upon the width of the one or more tiles such that when a column contains plural tiles, the plural tiles in the column have a same width relative to one another but can have a different height relative to one another, and wherein the processing system is configured to define the heights of tiles independently for each column such that when the one or more tiles form plural columns of tiles, tiles within different columns can have different heights relative to one another; or one or more rows of tiles, wherein the processing system is configured to impose constraints upon the height of the one or more tiles such that when a row contains plural tiles, the tiles within the row have the same height relative to one another but can have a different width relative to one another, and wherein the processing system is configured to define the widths of tiles independently for each row, such that then the one or more tiles form plural rows of tiles, tiles within different rows can have different widths relative to one another.

9. The method of claim 8, wherein the neural network processing to generate data for a portion of an output feature map comprises a layer of neural network processing, the method further comprising, once the portion of the output feature map has been written to memory, using at least part of the portion of the output feature map which has been written to memory for a portion of an input feature map to be processed by a next layer of neural network processing.

10. A data processing system comprising:

a processor operable to perform neural network processing; and a memory for storing data to be used when performing neural network processing;

wherein:

the processor is configured to:

perform neural network processing for respective portions of an input feature map, each portion of the input feature map comprising an array of data elements, each data element having respective data associated therewith, each data element having an associated position within the input feature map, each portion of the input feature map being smaller than the input feature map; and the data processing system further comprises processing circuitry configured to:

define a portion of an input feature map to be processed in terms of one or more tiles, wherein each tile corresponds to a respective region of the portion of the input feature map, each region corresponding to one or more positions of data elements within the array of data elements of the portion of the input feature map, wherein the tiles together form the entirety of the portion of the input feature map; and for each tile, provide information which allows each data element position forming the tile to be mapped to a respective memory location storing data for the data element associated with the position; and the processor is further configured to, when performing neural network processing for a portion of an input feature map:

when fetching from memory data for a data element position within the portion of the input feature map, identify which tile of the one or more defined tiles the position falls within, identify a memory location from which to read data for the position using the provided information which allows each position forming the tile to be mapped to a respective memory location, and read the data from the identified memory location; and process fetched data for one or more data elements in the input feature map portion so as to provide a data element or elements for a corresponding portion of an output feature map;

wherein the data processing system is configured to, when defining a portion of an input feature map to be processed in terms of one or more tiles:

define one or more tiles comprising one or more columns of tiles, wherein the data processing system is configured to impose constraints on the width of the one or more tiles relative to one another such that tiles within a same column have the same width relative to one another but may have a different height relative to one another, and wherein the data processing system is configured to define the heights of tiles independently for each column such that tiles within different columns may have different heights relative to one another; or define one or more tiles comprising one or more rows of tiles, wherein the data processing system is configured to impose constraints on the height of the one of more tiles relative to one another such that tiles within a same row have a same height relative to one another but may have a different width relative to one another, and wherein the processing system is configured to define the widths of tiles independently for each row such that tiles within different rows may have different widths relative to one another.

11. The data processing system of claim 10, wherein the processor is configured to perform neural network processing comprising a layer neural network processing for a portion of an input feature map, wherein the portion of the input feature map corresponds to at least part of a portion of an output feature map written to the memory when performing a previous layer of neural network processing by the same or a different processor.

12. The data processing system of claim 10, wherein the data processing system is configured to define up to a predetermined maximum number of available tiles to describe a portion of a feature map.

13. The data processing system of claim 10, wherein the data processing system is configured to define the portion of the feature map in terms of one or more tiles by setting one or more parameters from which a height and a width of each of the tiles can be determined.

14. The data processing system of claim 10, wherein the information provided by the data processing system which allows each position forming a tile to be mapped to a respective memory location storing data for the data element associated with the position comprises:
   information which allows a base position for the tile to be mapped to a base memory location; and
   and information which allows a location in memory for data for a data element relative to the base memory location for the tile to be determined from a relative position of the data element within the tile.

15. A data processing system comprising:
   a processor operable to perform neural network processing; and
   a memory for storing data generated when performing neural network processing;
   wherein:
   the processor is configured to:
      perform neural network processing to generate respective portions of an output feature map, each portion of the output feature map comprising an array of data elements, each data element having respective data associated therewith, each data element having an associated position within the output feature map, each portion of the output feature map being smaller than the output feature map; and
   the data processing system further comprises processing circuitry configured to:
      define a portion of an output feature map to be generated in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map; and
      for each tile, provide information which allows each data element position forming the tile to be mapped to a respective memory location for storing data for the data element associated with the position; and
   the processor is further configured to, when performing neural network processing to generate a portion of an output feature map:
      when storing into memory data for a data element position within the portion of the output feature map, identify which tile of the one or more defined tiles the position falls within, identify a memory location at which to store data for the position using the provided information which allows each position forming the tile to be mapped to a respective memory location, and store the data at the identified memory location;
   wherein the data processing system is configured to, when defining a portion of an output feature map to be processed in terms of one or more tiles:
      define one or more tiles comprising one or more columns of tiles, wherein the data processing system is configured to impose constraints on the width of the one of more tiles relative to one another such that tiles within a same column have the same width relative to one another but may have a different height relative to one another, and wherein the data processing system is configured to define the heights of tiles independently for each column such that tiles within different columns may have different heights relative to one another; or
      define one or more tiles comprising one or more rows of tiles, wherein the data processing system is configured to impose constraints on the height of the one of more tiles relative to one another such that tiles within a same row have a same height relative to one another but may have a different width relative to one another, and wherein the processing system is configured to define the widths of tiles independently for each row such that tiles within different rows may have different widths relative to one another.

16. The data processing system of claim 15, wherein the processor is configured to perform neural network processing comprising a layer of neural network processing to generate data for a portion of an output feature map, wherein at least part of the data generated for the portion of the output feature map is to be used as a portion of an input feature map to be processed according to a next layer of neural network processing performed by the same or different one or more processors.

17. A non-transitory computer readable storage medium storing computer software code which when executing on a processor performs a method of controlling a processor operable to perform neural network processing in a data processing system comprising a processor operable to perform neural network processing and a memory for storing data to be used when performing neural network processing, the method comprising at least one of:
   performing neural network processing for one or more portions of an input feature map, each portion of the input feature map comprising an array of data elements, each data element having respective data associated therewith, each data element having an associated position within the input feature map, the one or more portions of the input feature map each being smaller than the input feature map; and
   performing neural network processing to generate one or more portions of an output feature map, each portion of the output feature map comprising an array of data elements, each data element having respective data associated therewith, each data element having an associated position within the output feature map, the one or more portions of the output feature map each being smaller than the output feature map;
   the method comprising, when performing neural network processing for a portion of an input feature map:
      defining the portion of the input feature map in terms of one or more tiles, wherein each tile corresponds to a respective region of the portion of the input feature map, each region corresponding to one or more positions of data elements within the array of data elements of the portion of the input feature map, wherein the tiles together form the entirety of the portion of the input feature map;
      for each tile, providing information which allows each data element position forming the tile to be mapped to a respective memory location storing data for the data element associated with the position;

the processor, when fetching from memory data for a data element position within the portion of the input feature map, identifying which tile of the one or more defined tiles the position falls within, identifying a memory location from which to read data for the position using the provided information which allows each position forming the tile to be mapped to a respective memory location, and reading the data from the identified memory location; and the processor processing the fetched data for one or more data elements in the input feature map portion so as to provide a data element or elements for a corresponding portion of an output feature map; and the method comprising, when performing neural network processing to generate a portion of an output feature map:

defining the portion of the output feature map in terms of one or more tiles, wherein each tile corresponds to a respective region of the portion of the output feature map, each region corresponding to one or more positions of data elements within the array of data elements of the portion of the output feature map, wherein the tiles together form the entirety of the portion of the output feature map;

for each tile, providing information which allows each data element position forming the tile to be mapped to a respective memory location for storing data for the data element associated with the position;

the processor, when storing in memory data for a data element position within the portion of the output feature map, identifying which tile of the one or more defined tiles the position falls within, identifying a memory location at which to store data for the position using the provided information which allows each position forming the tile to be mapped to a respective memory location, and storing the data at the identified memory location;

wherein the one or more tiles defined for the portion of the input feature map or for the portion of the output feature map comprise:

one or more columns of tiles, wherein the processing system is configured to impose constraints upon the width of the one or more tiles such that when a column contains plural tiles, the plural tiles in the column have a same width relative to one another but can have a different height relative to one another, and wherein the processing system is configured to define the heights of tiles independently for each column such that when the one or more tiles form plural columns of tiles, tiles within different columns can have different heights relative to one another; or one or more rows of tiles, wherein the processing system is configured to impose constraints upon the height of the one or more tiles such that when a row contains plural tiles, the tiles within the row have the same height relative to one another but can have a different width relative to one another, and wherein the processing system is configured to define the widths of tiles independently for each row, such that then the one or more tiles form plural rows of tiles, tiles within different rows can have different widths relative to one another.

\* \* \* \* \*